United States Patent
Tahara et al.

(10) Patent No.: US 8,292,045 B2
(45) Date of Patent: Oct. 23, 2012

(54) BRAKE SYSTEM FOR A MOTORCYCLE INCLUDING VIBRATION-DAMPING SUPPORT STRUCTURE, AND MOTORCYCLE INCORPORATING SAME

(75) Inventors: Shuji Tahara, Wako (JP); Masatsugu Nishimura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 903 days.

(21) Appl. No.: 12/378,835

(22) Filed: Feb. 20, 2009

(65) Prior Publication Data

US 2009/0243374 A1    Oct. 1, 2009

(30) Foreign Application Priority Data

Mar. 31, 2008    (JP) ................... 2008-091945

(51) Int. Cl.
*B60T 8/72*    (2006.01)

(52) U.S. Cl. .................... 188/181 R; 188/382; 303/9.64
(58) Field of Classification Search .................. 188/382, 188/180 A, 181 R, 180; 303/9.64, 137; 180/218–220
See application file for complete search history.

(56) References Cited

U.S. PATENT DOCUMENTS

| | | | |
|---|---|---|---|
| 5,016,737 A * | 5/1991 | Hayashi et al. ........... | 188/181 A |
| 2007/0188012 A1 | 8/2007 | Hariu et al. | |
| 2007/0252430 A1 | 11/2007 | Nishikawa et al. | |

FOREIGN PATENT DOCUMENTS

| | | |
|---|---|---|
| EP | 1 820 710 A1 | 8/2007 |
| EP | 1 847 430 A1 | 10/2007 |
| JP | 63-017662 B2 | 4/1988 |
| JP | 02-011448 B2 | 1/1990 |
| JP | 07-88158 | 9/1995 |

* cited by examiner

*Primary Examiner* — Melanie Torres Williams
(74) *Attorney, Agent, or Firm* — Carrier Blackman & Associates, P.C.; William D. Blackman; Joseph P. Carrier

(57) ABSTRACT

In a brake system for a motorcycle in which a pressure-regulating unit is interposed between a wheel brake and fluid pressure generating unit capable of generating a fluid pressure independently of an operation of a brake operating element is controlled by a control unit based on a value detected by an operating amount detector which detects an operating amount of the brake operating element. To prevent adverse influences of not only vibrations from an engine, but also heat from the engine, from being exerted on the pressure-regulating unit, such is floatingly supported by a support supported on a body frame of the motorcycle through an elastic case covering the pressure-regulating unit.

20 Claims, 24 Drawing Sheets

BRAKE SYSTEM FOR A MOTORCYCLE INCLUDING VIBRATION-DAMPING SUPPORT STRUCTURE, AND MOTORCYCLE INCORPORATING SAME

CROSS-REFERENCE TO RELATED APPLICATIONS

The present invention claims priority under 35 USC 119 based on Japanese patent application No. 2008-091945, filed on Mar. 31, 2008. The entire subject matter of this priority document, including specification, claims and drawings, is incorporated by reference herein.

BACKGROUND OF THE INVENTION

1. Field of the Invention

The present invention relates to a brake system for a motorcycle, including an operating amount detector for detecting an operating amount of a brake operating element, a fluid pressure generating unit capable of generating a fluid pressure independent of the brake operating element, a pressure-regulating unit interposed between the fluid pressure generating unit and a wheel brake so as to regulate an output fluid pressure of the fluid pressure generating unit, and operable to apply the regulated fluid pressure to the wheel brake, and a control unit for controlling the operation of the pressure-regulating unit based on a value detected by the operating amount detector.

2. Description of the Background Art

A configuration in which a pressure-regulating unit is mounted to a body frame on the rear side of an engine mounted on a motorcycle has been known, as described in the Japanese Patent Publication Nos. Sho 63-17662 and Hei 7-88158, for example.

In the configuration described in these Patent Publications, an influence of vibrations transmitted from the engine mounted on the body frame cannot be prevented from being exerted on the pressure-regulating unit. In order to control the fluid pressure in the wheel brake with high accuracy, the influence of the vibrations transmitted from the engine on the pressure-regulating unit has to be surely eliminated.

The present invention has been made in consideration of the above-mentioned circumstances. Accordingly, it is an object of the present invention to provide a brake system for a motorcycle by which not only the influence of vibrations transmitted from an engine, but also the influence of heat, can be prevented from being exerted on a pressure-regulating unit.

SUMMARY OF THE INVENTION

In order to achieve the above and other objects, according to a first aspect and feature of the present invention there is provided a brake system for a motorcycle, comprising an operating amount detector for detecting an operating amount of a brake operating element, a fluid pressure generating unit capable of generating a fluid pressure independent of the brake operating element, a pressure-regulating unit interposed between the fluid pressure generating unit and a wheel brake so as to regulate an output fluid pressure of the fluid pressure generating unit and to apply the regulated fluid pressure to the wheel brake, a control unit for controlling the operation of the pressure-regulating unit based on a value detected by the operating amount detector, an elastic case covering the pressure-regulating unit, and a support supporting the elastic case on a body frame of the motorcycle, to thereby is floatingly support the pressure-regulating unit.

According to a second aspect and feature of the present invention, in addition to the first aspect and feature, the pressure-regulating unit is disposed at a position at a rear side of an intake system of the motorcycle, wherein the intake system is connected to a cylinder head of an engine body mounted on the body frame and extended upwards from the cylinder head and between the engine body and a fuel tank disposed on an upper side of the engine body.

According to a third aspect and feature of the present invention, in addition to the first aspect and feature, the elastic case includes lower and upper case members formed of elastic material and provided as bisected lower and upper parts which clamp the pressure-regulating unit from lower and upper sides, and of the case members, at least the lower case member is integrally provided at its inner surface with a plurality of projections which contact the pressure-regulating unit.

Incidentally, a brake lever 15 in the non-limiting, exemplary embodiment described below corresponds to the brake operating element in the present invention, a front wheel fluid pressure generating unit 17F in the exemplary embodiment corresponds to the fluid pressure generating unit in the invention, a front pressure-regulating unit 18F in the exemplary embodiment corresponds to the pressure-regulating unit in the invention, a first pressure sensor 34 in the exemplary embodiment corresponds to the operating amount detector, and a front wheel brake BF in the exemplary embodiment corresponds to the wheel brake.

EFFECTS OF THE INVENTION

According to the first aspect and feature of the invention, the pressure-regulating unit is covered by the elastic case, whereby the influence of the heat from the engine can be prevented from being exerted on the pressure-regulating unit. In addition, since the pressure-regulating unit is floatingly supported through the elastic case on the support supported on the body frame, transmission of vibrations from the engine to the pressure-regulating unit can be surely suppressed.

According to the second aspect and feature of the invention, the pressure-regulating unit is disposed at a position at a rear side of an intake system of the motorcycle, wherein the intake system is connected to a cylinder head of an engine body mounted on the body frame and extended upwards from the cylinder head and between the engine body and a fuel tank disposed on an upper side of the engine body. Therefore, the pressure-regulating unit is disposed at such a position as to be less liable to be exposed to the radiant heat from an exhaust system of the engine, whereby the influence of the heat from the engine can be effectively restrained from being exerted on the pressure-regulating unit. Moreover, the pressure-regulating unit is arranged in a comparatively large vacant space at the rear side of the intake system, whereby the influence of the pressure-regulating unit on the layout of other component parts can be minimized.

According to the third aspect and feature of the invention, the pressure-regulating unit can be floatingly supported assuredly, while facilitating an operation of containing the pressure-regulating unit in the elastic case.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

A non-limiting, exemplary embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention. Further, it should be noted that where a reference number is followed herein by multiple dots such as . . . , that is a short way of indicating that more than one of that referenced component is present in the assembled structure.

Now, a mode of carrying out the present invention will be described below, based on the exemplary embodiment of the invention shown in the attached drawings.

Figure 1:
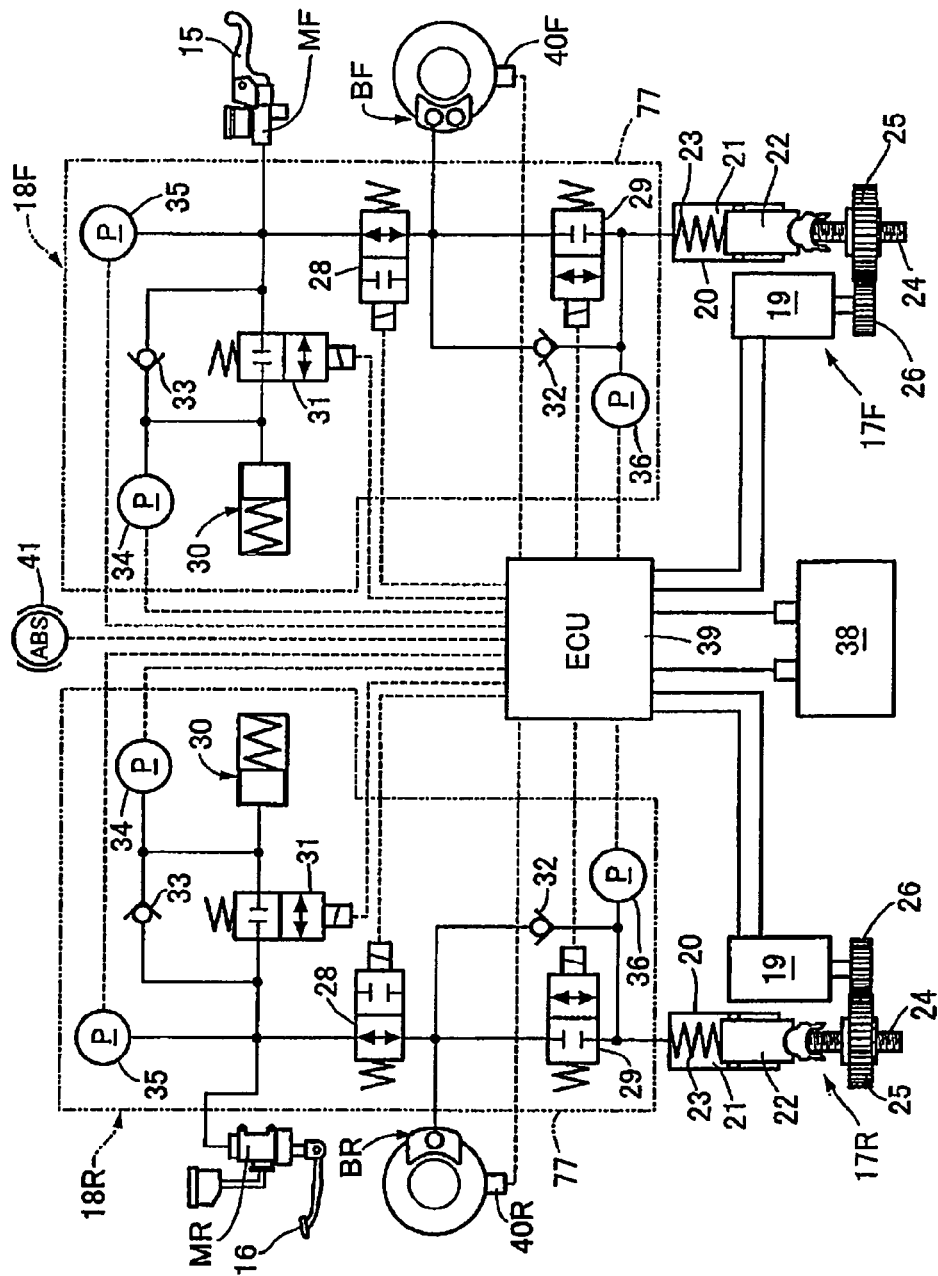
FIG. 1 is a simplified schematic diagram showing a configuration of a brake system for a motorcycle according to a selected illustrative embodiment of the invention.

First, in FIG. 1, a front wheel brake BF provided in a motorcycle is provided with a front pressure-regulating unit 18F by which a fluid pressure outputted from a front master cylinder MF according to an operation of a brake lever 15 serving as a brake operating element can be exerted and by which a fluid pressure outputted from front fluid pressure generating unit 17F can also be exerted. The front pressure-regulating unit 18F is interposed between the front master cylinder MF and the front fluid pressure generating unit 17F, and the front wheel brake BF. In addition, the rear-wheel wheel brake BR is provided with rear-wheel pressure-regulating unit 18R by which a fluid pressure outputted from a rear-wheel master cylinder MR according to an operation of a brake pedal 16 serving as a brake operating element can be exerted and by which a fluid pressure outputted from rear-wheel fluid pressure generating unit 17R can also be exerted. The rear-wheel pressure-regulating unit 18R is interposed between the rear-wheel master cylinder MR and the rear-wheel fluid pressure generating unit 17R, and the rear-wheel wheel brake BR.

The front fluid pressure generating unit 17F, which generates a fluid pressure by operation of an electric motor 19, includes: the electric motor 19, a piston 22 slidably fitted in a cylinder body 20 while forming a fluid pressure chamber 21 between itself and the cylinder body 20; a return spring 23 disposed in a compressed state between the cylinder body 20 and the piston 22 so as to urge the piston 22 to the side for increasing the internal volume of the fluid pressure chamber 21; a pushing shaft 24 coaxially linked to the piston 22 from the side opposite to the fluid pressure chamber 21; and a gear mechanism 26 which has a gear 25 coaxially screw engaged with the pushing shaft 24 through a ball screw (not shown) and which is connected to an output shaft of the electric motor 19. The front fluid pressure generating unit 17F can output, from the fluid pressure chamber 21, a fluid pressure varying according to the operation of the electric motor 19.

The rear-wheel fluid pressure generating unit 17R is configured in the same fashion as the front fluid pressure generating unit 17F discussed above, and, therefore, it is only shown in the figure with its parts corresponding to those of the front fluid pressure generating unit 17F being denoted by the same reference symbols as used above, and with detailed description thereof omitted.

The front pressure-regulating unit 18F includes: a first solenoid-operated on-off valve 28 for switching the communication/cutoff between the front master cylinder MF and the front wheel brake BF; a second solenoid-operated on-off valve 29 for switching the communication/cutoff between the front fluid pressure generating unit 17F and the front wheel brake BF; a stroke simulator 30 for exerting a dummy reaction force according to the operating amount of the brake lever 15 on the front master cylinder MF when the first solenoid-operated on-off valve 28 is closed; a third solenoid-operated on-off valve 31 for switching the communication/cutoff between the stroke simulator 30 and the front master cylinder MF; a first one-way valve 32 connected in parallel to the second solenoid-operated on-off valve 29 so as to permit the flow of a brake fluid from the front fluid pressure generating unit 17F to the side of the front wheel brake BF; and a second one-way valve 33 connected in parallel to the third solenoid-operated on-off valve 31 so as to permit the flow of the brake fluid from the stroke simulator 30 to the side of the front wheel brake BF. The pressure in the stroke simulator 30 is detected by a first pressure sensor 34 serving as operating amount detector, the output fluid pressure of the front master cylinder MF is detected by a second pressure sensor 35, and the output fluid pressure of the front fluid pressure generating unit 17F is detected by a third pressure sensor 36.

The first pressure sensor 34 obtains the operating amount of the brake lever 15 by detecting the output fluid pressure of the front master cylinder MF when the first solenoid-operated on-off valve 28 is closed. The second pressure sensor 35 is provided for fail-safe diagnosis, and a judgment that an abnormal state is present can be made when a difference of not less than a predetermined value is generated between the pressure detected by the second pressure sensor 35 and the value detected by the first pressure sensor 34. In addition, the value detected by the third pressure sensor 36 is used in a fluid pressure feedback control for controlling the output fluid pressure of the front fluid pressure generating unit 17F based on the value detected by the first pressure sensor 34.

The first solenoid-operated on-off valve 28 is a normally open type solenoid valve, while the second and third solenoid-operated on-off valves 29, 31 are normally closed type solenoid on-off valves. The opening/closing operations of the first to third solenoid-operated on-off valves 28, 29, 31 and the operations of the electric motor 19 in the front fluid pressure generating unit 17F are controlled by a control unit 39 connected with a battery 38. The control unit 39 is supplied as inputs with a value detected by a front speed sensor 40F and the values detected by the first to third pressure sensors 34, 35, 36. Based on the value detected by the front speed sensor 40F and the values detected by the first to third pressure sensors 34 to 36, the control unit 39 controls the opening/closing operations of the first to third solenoid-operated on-off valves 28, 29, 31 and the operation of the electric motor 19. In addition, an alarm lamp 41 is connected to the control unit 39.

At the ignition-ON times of the motorcycle, the first solenoid-operated on-off valve 28 is in the open state, whereas the second and third solenoid-operated on-off valves 29, 31 are in the closed state, the electric motor 19 is in the non-operative state, and the alarm lamp 41 is in the ON state. When the brake lever 15 is operated to cause a fluid pressure to be outputted from the front master cylinder MF under this condition, the fluid pressure is exerted on the front wheel brake BF through the first solenoid-operated on-off valve 28.

When running of the motorcycle is started, the control unit 39 performs an initial diagnosis, and turns OFF the alarm lamp 41 if the system is judged to be in a normal condition. After the start of the running of the motorcycle, the system is put into a stand-by state, the third solenoid-operated on-off valve 31 is opened, and the front master cylinder MF is put into the state of communicating with the stroke simulator 30.

In response to the detection by the first pressure sensor 34 of a fluid pressure of not less than a predetermined value due to an operation of the brake lever 15 during the stand-by condition, the control unit 39 closes the first solenoid-operated on-off valve 28 and opens the second solenoid-operated on-off valve 29. Further, the control unit 39 operates the electric motor 19 of the front fluid pressure generating unit 17F, to control the output fluid pressure of the front fluid pressure generating unit 17F, which is detected by the third pressure sensor 36, in such a manner that the output fluid pressure of the front fluid pressure generating unit 17F will be brought to a pressure according to the value detected by the first pressure sensor 34. This ensures that the front wheel brake BF is supplied with the fluid pressure outputted from the front fluid pressure generating unit 17F according to the operational load on the brake lever 15.

The rear-wheel pressure-regulating unit 18R is configured in the same fashion as the front pressure-regulating unit 18F above, and, therefore, it is only shown in the figure with its parts corresponding to those of the front pressure-regulating unit 18F being denoted by the same reference symbols as used above, and with detailed description thereof omitted. Incidentally, in the fluid pressure control by the rear-wheel pressure-regulating unit 18R, the control unit 39 uses the value detected by the rear-wheel speed sensor 40R in place of the value detected by the front speed sensor 40F which is used in the fluid pressure control by the front pressure-regulating unit 18F.

In addition, by performing the fluid pressure control by the rear-wheel pressure-regulating unit 18R together with the fluid pressure control by the front pressure-regulating unit 18F according to the operation of the brake lever 15, the control unit 39 can carry out a rear-wheel braking force distribution control by which the front and rear-wheel wheel brakes BF, BR are operated so as to exert distributed braking forces on the front wheel and the rear wheel. Besides, on the contrary, by performing the fluid pressure control by the front pressure-regulating unit 18F together with the fluid pressure control by the rear-wheel pressure-regulating unit 18R in response to the operation of the brake pedal 16, the control unit 39 can carry out a rear-wheel braking force distribution control by which the front and rear-wheel wheel brakes BF, BR are operated so as to apply distributed braking forces to the front wheel and the rear wheel.

Figure 2:
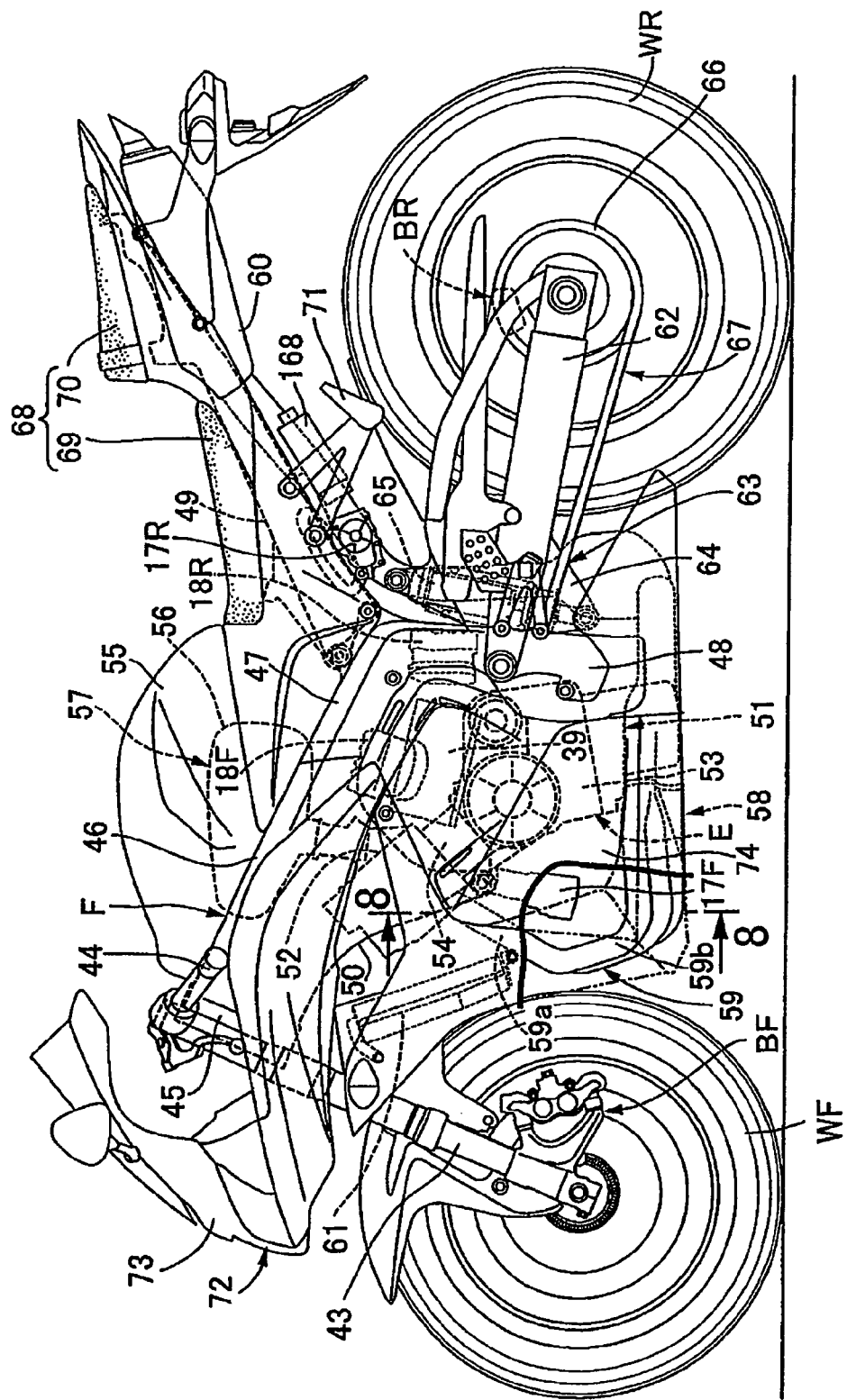
FIG. 2 is a left side view of a motorcycle having a brake system according to an exemplary embodiment of the present invention.

In FIG. 2, the body frame F of the motorcycle includes: a head pipe 45 on which a front fork 43 rotatably bearing the front wheel WF equipped with the front wheel brake BF and a steering handle 44 connected to the front fork 43 are steerably borne; a left-right pair of main frames 46 . . . extending rearwardly downwards from the head pipe 45; center frames 47 . . . connected respectively to rear parts of both the main frames 46 . . . ; pivot plates 48 . . . integrally connected to the center frames 47 . . . and extending downwards; and a left-right pair of seat rails 49 . . . connected to rear parts of the center frames 47 . . . and extending rearwardly upwards. As used herein, the symbol ". . ." is used to indicate a discussion of the given component(s) of the motorcycle is abbreviated, but would be understood by persons of ordinary skill in the motorcycle art.

The main frames 46 . . . are integrally provided with engine hangers 50 . . . extending downwards. An engine body 51 of an engine E of the in-line four-cylinder type, for example, is supported by lower parts of the engine hangers 50 . . . , the center frames 47 . . . and the pivot plates 48 . . . , in such an attitude that the cylinder axis thereof is inclined forwardly upwards.

The engine body 51 includes: a crankcase 53; a cylinder block 54 rising at a forwardly upward inclination from the crankcase 53; and a cylinder head 52 connected to an upper part of the cylinder block 54.

A fuel tank 55 is mounted on both the main frames 46 . . . on the upper side of the engine body 51. In addition, an upwardly extending intake system 57 is connected to a rear surface of the cylinder head 52 of the engine body 51, and an air cleaner 56 that the intake system 57 has at its upstream end is so disposed as to be covered with the fuel tank 55. On the other hand, an exhaust system 58 connected to a front surface of the cylinder head 52 includes: a plurality of exhaust pipes 59 . . . which are connected to the front surface of the cylinder head 52 in the manner of corresponding respectively to the cylinders and which extend downwards from the cylinder head 52; and an exhaust muffler 60 disposed between rear parts of both the seat rails 49 . . . in the state of being connected to the exhaust pipes 59 . . . . Moreover, the exhaust pipes 59 . . . have inclined parts 59a extending forwardly downwards from the front surface of the cylinder head 52, and curved parts 59b curved from lower parts of the inclined parts 59a . . . toward the lower side of the engine body 51, so that in side view a triangularly-shape space is formed between the exhaust pipes 59 and the front surface of the engine body 51. Furthermore, on the front side of the engine body 51, a radiator 61 is fixedly disposed so as to be located on the skew upper side of the exhaust pipes 59 . . . .

On the pivot plates 48 . . . of the body frame F, a front end part of a swing arm 62 rotatably supporting the rear wheel WR (which is equipped with the rear-wheel wheel brake BR) on its rear end parts is vertically swingably borne. A link mechanism 63 is provided between a front-end-side lower part of the swing arm 62 and lower parts of the pivot plates 48, and a lower end part of a cushion unit 65 connected at its upper end part to the swing arm 62 and extending vertically is connected to a link member 64 constituting a part of the link mechanism 63.

Besides, an output from a transmission (not shown) incorporated in the crankcase 53 possessed by the engine body 51 is transmitted to the rear wheel WR through a chain-type power transmission mechanism 67 having an endless chain 66.

A riders' seat 68 is provided on the seat rails 49 . . . so as to be disposed on the rear side of the fuel tank 55. The riders' seat 68 includes a front seat 69 on which to seat the driver, and a rear seat 70 on which to seat the passenger and which is spaced to the rear side from the front seat 69. Pillion steps 71 on which to rest the feet of the passenger seated on the rear seat 70 are fastened to outside surfaces of intermediate parts of the seat rails 49 . . . .

A part of the body frame F and the engine E are covered with a front cowl 72 formed from a synthetic resin. The front cowl 72 includes a front cover part 73 for covering the head pipe 45 on the front side, and side covers 74 . . . which are in connection with the front cover 73 and which cover the engine body 51, the exhaust pipes 59 . . . of the exhaust system 58, and the radiator 61 on both lateral sides.

In the motorcycle as described above, the front fluid pressure generating unit 17F, the front pressure-regulating unit 18F, the rear-wheel fluid pressure generating unit 17R, the rear-wheel pressure-regulating unit 18R and the control unit 39 are disposed in the vicinity of the engine E, i.e., in the vicinity of the center of the vehicle body.

Now, a structure for arrangement of the front fluid pressure generating unit 17F, the front pressure-regulating unit 18F, the rear-wheel fluid pressure generating unit 17R, the rear-wheel pressure-regulating unit 18R, and the control unit 39 in the motorcycle, and the operations and effects of the structure, will be sequentially described below.

Front Pressure-regulating Unit 18F

An arrangement structure of the front pressure-regulating unit 18F will be described referring to FIGS. 3 to 7. First, in FIG. 3, the first solenoid-operated on-off valve 28, the second solenoid-operated on-off valve 29, the stroke simulator 30, the third solenoid-operated on-off valve 31, the first one-way valve 32, and the second one-way valve 33 which constitute the front pressure-regulating unit 18F are arranged on a base 77 formed in a rectangular parallelepiped (box-like) shape by, for example, casting of a light metal such as an aluminum alloy. Projecting parts of the first solenoid-operated on-off valve 28, the second solenoid-operated on-off valve 29, the third solenoid-operated on-off valve 31, the first one-way valve 32 and the second one-way valve 33 which are projecting from the base 77 are covered by a synthetic resin-made cover 78 integrally provided with a terminal connector 78a. The first to third pressure sensors 34 to 36 are also arranged on the base 77, and projecting parts of the first to third pressure sensors 34 to 36 which are projecting from the base 77 are also covered with the cover 78.

Referring to FIGS. 4 to 7 also, the front pressure-regulating unit 18F is arranged in a position which is on the rear side of the intake system 57 being connected to the cylinder head 52 of the engine body 51 mounted on the body frame F and being extended upwards from the cylinder head 52 and which is between the engine body 51 and the fuel tank 55 disposed on the upper side of the engine body 51. The front pressure-regulating unit 18F is supported in a vibration-damping manner, through an elastic case 79 covering the pressure-regulating unit 18F, on a support member 83 supported on the body frame F.

The elastic case 79 includes lower and upper case members 80, 81 provided as bisected lower and upper parts so as to clamp the front pressure-regulating unit 18F in such an attitude as to have the base 77 located on the upper side. Both the case members 80, 81 are formed of elastic material, for example, rubber or a flexibly resilient elastomer.

Figure 3:
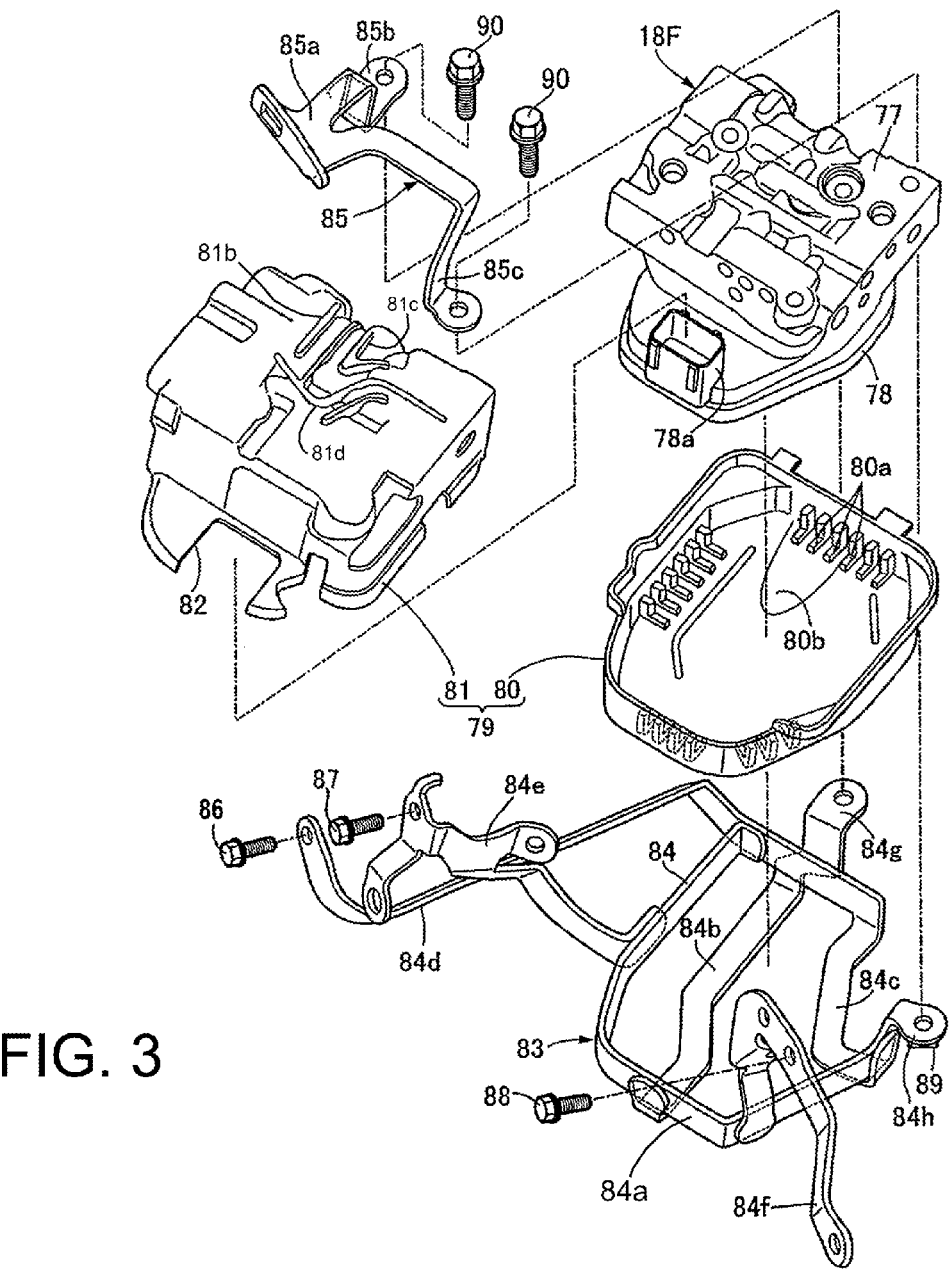
FIG. 3 is an exploded perspective view of a support structure for a front pressure unit according to an exemplary embodiment of the present invention.
Figure 4:
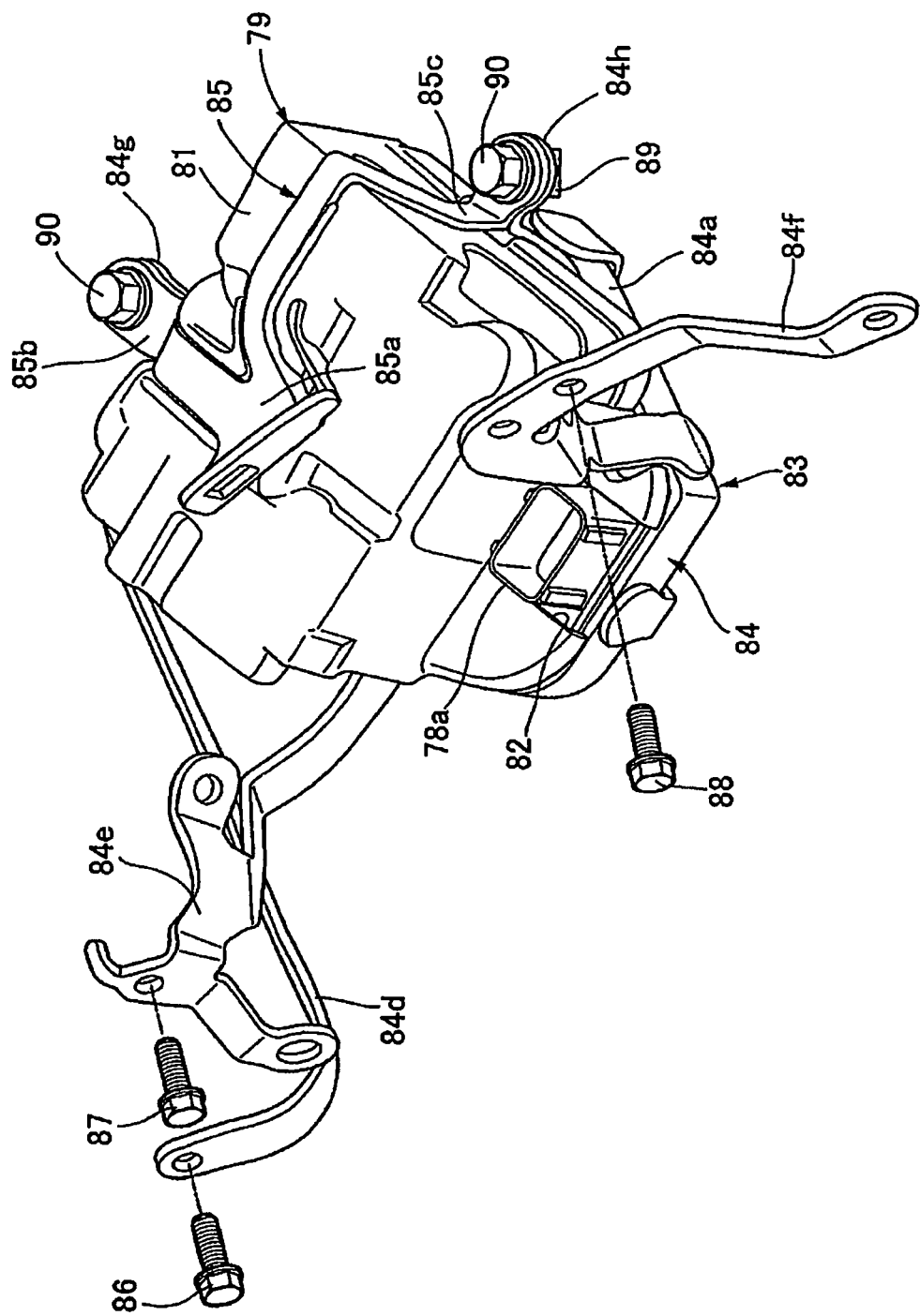
FIG. 4 is a perspective view showing the condition where the front pressure-regulating unit is supported by a support.
Figure 5:
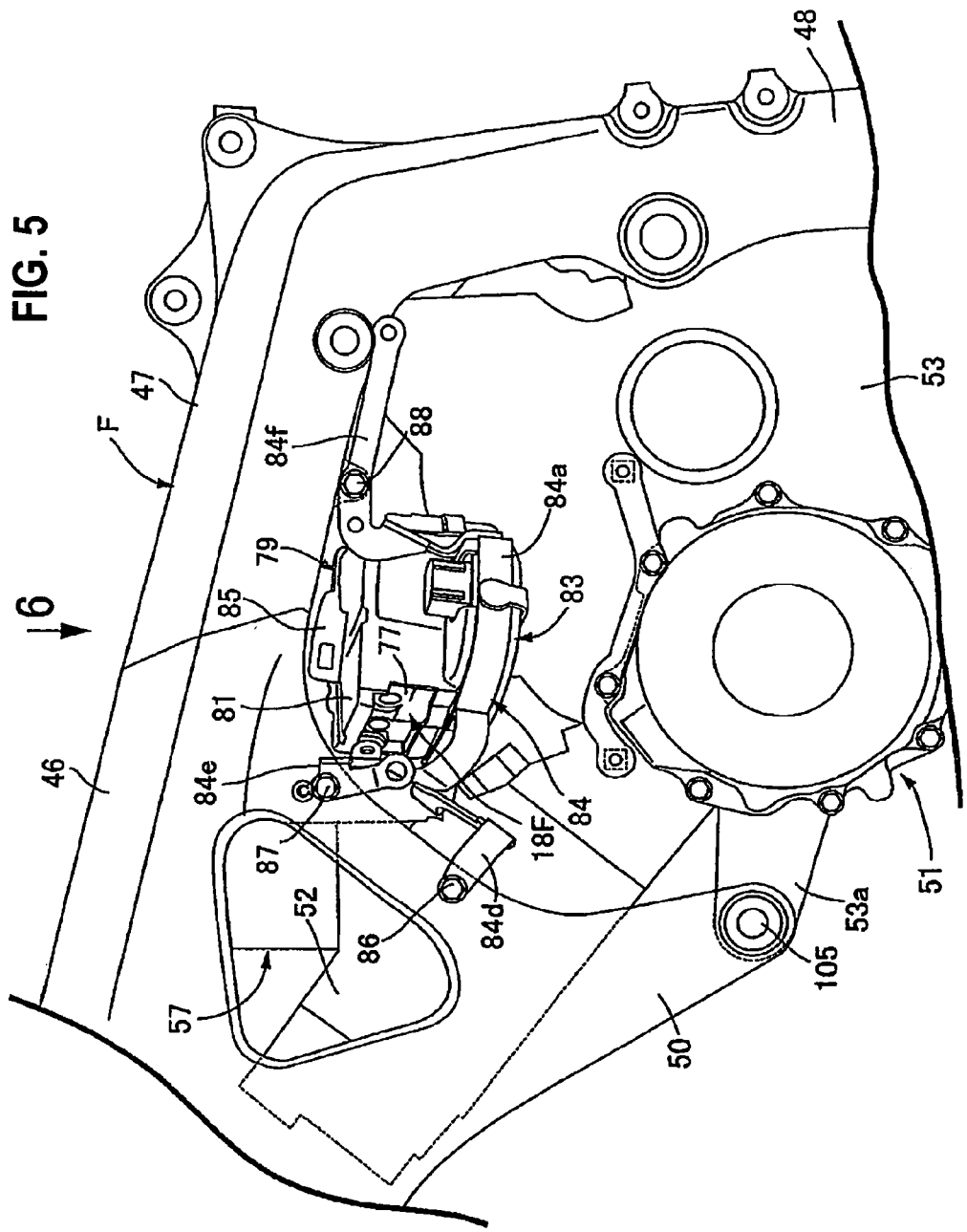
FIG. 5 is a side view showing the condition where the front pressure-regulating unit is supported on a body frame of the motorcycle.
Figure 6:
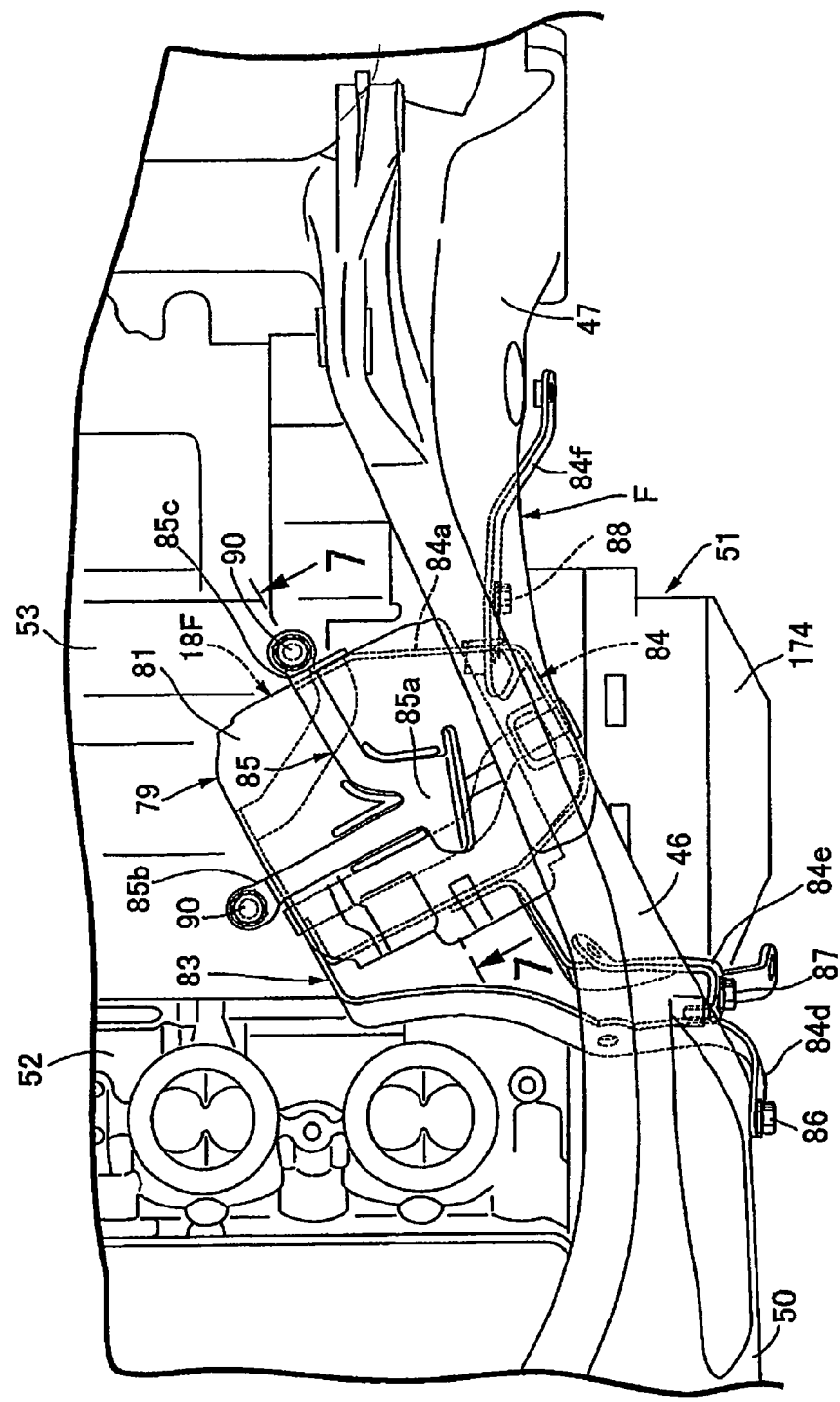
FIG. 6 is a plan view taken along arrow 6 of FIG. 5.
Figure 7:
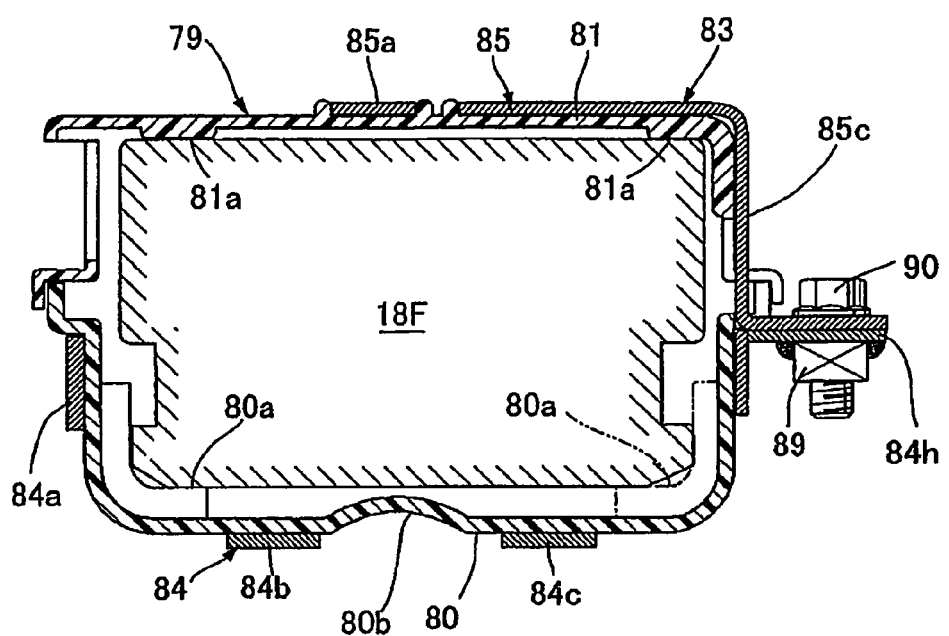
FIG. 7 is a sectional view taken along line 7-7 of FIG. 6.

The lower case member 80 is formed in a box-like shape open to the upper side so that the cover 78 of the front pressure-regulating unit 18F can be fitted therein, and the upper case member 81 is formed in a box-like shape open to the lower side so that the base 77 of the front pressure-regulating unit 18F can be fitted therein. As shown in FIG. 3, the upper case member 81 of the elastic case 79 has a plurality of upwardly-extending alignment ribs 81b, 81c and 81d integrally formed on an upper surface thereof. Moreover, the upper case member 81 is provided with a cutout 82 for permitting the terminal connector 78a of the cover 78 to project therethrough. In addition, of both the case members 80 and 81, at least the lower case member 80 is integrally and projectingly provided at its inner surface, in this embodiment, both the case members 80 and 81 are integrally and projectingly provided at their inner surface, with a plurality of substantially L-shaped projections 80a . . . , 81a . . . put into the pressure-regulating unit 18F. The projections 80a are spaced apart from one another to provide additional cooling to the pressure-regulating unit 18F.

The support member 83 is composed in a cage-like form by use of a lower cage body portion 84 which is attached to the body frame F so as to substantially cover a whole perimeter of a lower part of the front pressure-regulating unit 18F, and to support the front pressure-regulating unit 18F on the lower side of the latter, and an upper cage body portion 85 which is fastened to the lower cage body portion 84. The upper cage portion 85 of the support member 83 fits on top of the upper case member 81 of the elastic case 79, between the alignment ribs 81b, 81c and 81d, which are provided to fix the position of the upper cage body portion therebetween.

The lower cage body portion 84 has a plurality of bent, small-width metallic plate materials connected to each other. Specifically, the lower cage body portion 84 includes: a wrap-around cage part 84a surrounding substantially the whole perimeter of the lower part of the front pressure-regulating unit 18F; and two support plate parts 84b, 84c connected to the wraparound cage part 84*a* so as to support the front pressure-regulating unit 18F on the lower side of the latter. It is not necessary for the wraparound cage part 84*a* to completely encircle the case 79, but it should extend a substantial distance around the case, as shown. The lower cage body portion 84 also includes three support arm parts 84*d*, 84*e*, 84*f* attached to and extending outwardly sideways from the wraparound cage part 84*a*; and two attaching projected parts 84*g*, 84*h* projected from the wraparound cage part 84*a* for being fastened to the upper wraparound cage part 85. The three support arm parts 84*d*, 84*e*, 84*f* cooperate to securely mount the case 79 and the front pressure-regulating unit 18F on the body frame F.

The front pressure-regulating unit 18F, together with the lower case member 80 housing a lower part thereof, is fitted into and supported by the wraparound cage part 84*a* and both the support plate parts 84*b*, 84*c* of the lower frame body 84.

The support arm parts 84*d*, 84*e*, 84*f* are extended to the side of the left-side main frame 46 and the left-side center frame 47, of both the main frames 46 . . . and both the center frames 47 . . . , of the body frame F. The support arm part 84*d* is fastened to the engine hanger 50 integral with the main frame 46 by a bolt 86, the support arm part 84*e* is fastened to the main frame 46 on the rear side relative to the engine hanger 50 by a bolt 87, and the support arm part 84*f* is fastened to the center frame 47 by a bolt 88.

The upper frame body 85 is brought from above into contact with the upper case member 81 fitted from above into an upper part, or the base 77, of the front pressure-regulating unit 18F, and is fastened to both the attaching projected parts 84*g*, 84*h* of the lower frame body 84. The upper frame body 85 integrally includes: a presser part 85*a* put into contact with the upper case member 81 from above; and a pair of attaching leg parts 85*b*, 85*c* extended from the presser part 85*a* toward the sides of both the attaching projected parts 84*g*, 84*h*.

On the other hand, weld nuts 89 . . . are firmly attached to the lower surfaces of both the attaching projected parts 84*g*, 84*h* of the lower frame body 84. Bolts 90, 90 passed through tip parts of both the attaching leg parts 85*b*, 85*c* and through both the attaching projected parts 84*g*, 84*h* are screw engaged with the weld nuts 89 . . . and tightened, whereby the upper frame body 85 is fastened to the lower frame body 84. As a result, the support 83 is composed in a frame form by use of the lower frame body 84 which is attached to the body frame F so as to cover substantially the whole perimeter of the lower part of the front pressure-regulating unit 18F and to support the front pressure-regulating unit 18F on the lower side of the latter, and the upper frame body 85 fastened to the lower frame body 84. Besides, the front pressure-regulating unit 18F is clamped between the lower frame body 84 and the upper frame body 85, with the lower case member 80 and the upper case member 81 (which are formed of an elastic material) interposed therebetween.

Moreover, the front pressure-regulating unit 18F is disposed on the upper side of and in proximity to a cooling pipe (not shown) constituting a part of a cooling water circulation circuit provided for the engine E. In view of this, the lower case member 80 is provided in its lower surface with a recessed part 80*b* which is curved to the upper side in order to obviate/avoid interference with the cooling water pipe, whereby a cooling effect on the front pressure-regulating unit 18F owing to the arrangement of the unit in proximity to the cooling water pipe can be obtained.

According to the arrangement structure of the front pressure-regulating unit 18F as above, the front pressure-regulating unit 18F is covered by the elastic case 79, so that the influence of the heat from the engine E can be prevented from being exerted on the front pressure-regulating unit 18F. In addition, since the front pressure-regulating unit 18F is floatingly supported through the elastic case 79 on the support 83 supported on the body frame F, transmission of vibrations from the engine E to the front pressure-regulating unit 18F can be suppressed.

Moreover, the front pressure-regulating unit 18F is arranged in a position which is on the rear side of the intake system 57 connected to the cylinder head 52 of the engine body 51 mounted on the body frame F and extended upwards from the cylinder head 52, and which is between the engine body 51 and the fuel tank 55 disposed on the upper side of the engine body 51. This ensures that the front pressure-regulating unit 18F is disposed at such a position as to be less liable to be exposed to the radiant heat from the exhaust system 58 of the engine E, whereby the influence of the heat from the engine E upon the front pressure-regulating unit 18F can be effectively restrained. In addition, the front pressure-regulating unit 18F is laid out in a comparatively large vacant space on the rear side of the intake system 57, whereby the influence of the front pressure-regulating unit 18F upon the layout of other component parts can be minimized.

Besides, the elastic case 79 is composed of the elastic material-made lower and upper case members 80, 81 provided as bisected lower and upper parts so as to clamp the front pressure-regulating unit 18F respectively from the lower and upper sides, and of the case members 80, 81, at least the lower case member 80 is (in this embodiment both of the case members 80 and 81 are) integrally and projectingly provided at their inner surfaces with the plurality of projected parts 80*a* . . . , 81*a* . . . which contact with the front pressure-regulating unit 18F. Therefore, the front pressure-regulating unit 18F can be floatingly supported assuredly while facilitating the operation of containing the front pressure-regulating unit 18F into the elastic case 79.

Furthermore, the front pressure-regulating unit 18F is floatingly supported, through the lower and upper case members 80 and 81 of the elastic case 79, on the support 83 mounted to the body frame F. Besides, the support 83 is composed in a frame form by use of the lower frame body 84 which is attached to the body frame F so as to cover substantially the whole perimeter of the lower part of the front pressure-regulating unit 18F and to support the front pressure-regulating unit 18F on the lower side of the latter, and the upper frame body 85 which is fastened to the lower frame body 84. Moreover, the front pressure-regulating unit 18F is clamped between the lower frame body 84 and the upper frame body 85, with the lower and upper case members 80 and 81 therebetween. Therefore, by a simple process in which the front pressure-regulating unit 18F is mounted to the lower frame body 84 attached to the body frame F through the lower case member 80 and then the upper frame body 85 with the upper case member 81 interposed between itself and the front pressure-regulating unit 18F is attached to the lower frame body 84, the front pressure-regulating unit 18F can be floatingly supported on the support 83 mounted to the body frame F. Thus, the mounting operation is facilitated.

Front Fluid Pressure Generating Unit 17F

An arrangement structure of the front fluid pressure generating unit 17F will be described referring to FIGS. 8 to 13. First, as shown in FIG. 2, the front fluid pressure generating unit 17F is arranged between the engine body 51 and the exhaust pipes 59 . . . extended downwards from the front surface of the cylinder head 52 in the engine body 51. Moreover, the exhaust pipes 59 . . . include the inclined parts 59*a* . . . which extends forwardly downwards from the front surface of the cylinder head 52, and the curved parts 59*b* . . .

which are curved from the lower parts of the inclined parts 59a . . . toward the lower side of the engine body 51, in such a manner that in side view a rectangular-shaped space is formed between these components and the front surface of the engine body 51, with the front fluid pressure generating unit 17F being arranged in the space. Furthermore, the front fluid pressure generating unit 17F is arranged on the rear lower side of the radiator 61 which is supported on the body frame F on the front side of the engine body 51.

Figure 8:
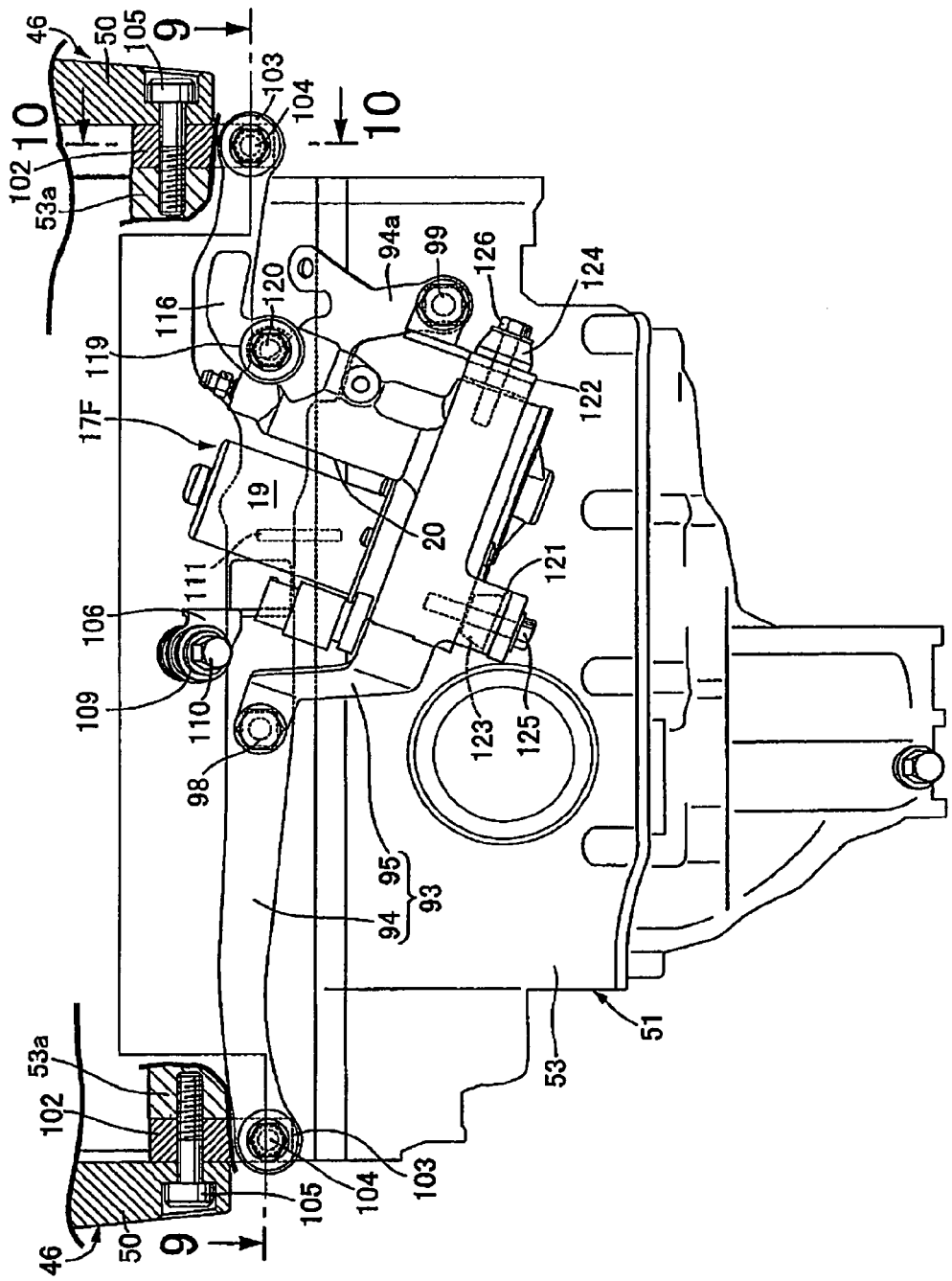
FIG. 8 is a partly cut-away front view, as viewed along line 8-8 of FIG. 2, of the body frame, an engine body and a front fluid pressure generating unit according to an exemplary embodiment of the present invention.

In FIG. 8, the front fluid pressure generating unit 17F is supported, through support 93, on the engine hangers 50 . . . provided to be integral with the left-right pair of main frames 46 which extend rearwardly downwards from the head pipe 45 and which constitute a part of the body frame F. The support 93 is composed in a frame form by use of a first support frame 94 which is attached to the engine hangers 50 . . . and which extends in the left-right direction on the rear side of the front fluid pressure generating unit 17F, and a second support frame 95 which is attached to the first support frame 94 in such a manner as to surround the front fluid pressure generating unit 17F from the front side of the latter.

Figure 9:
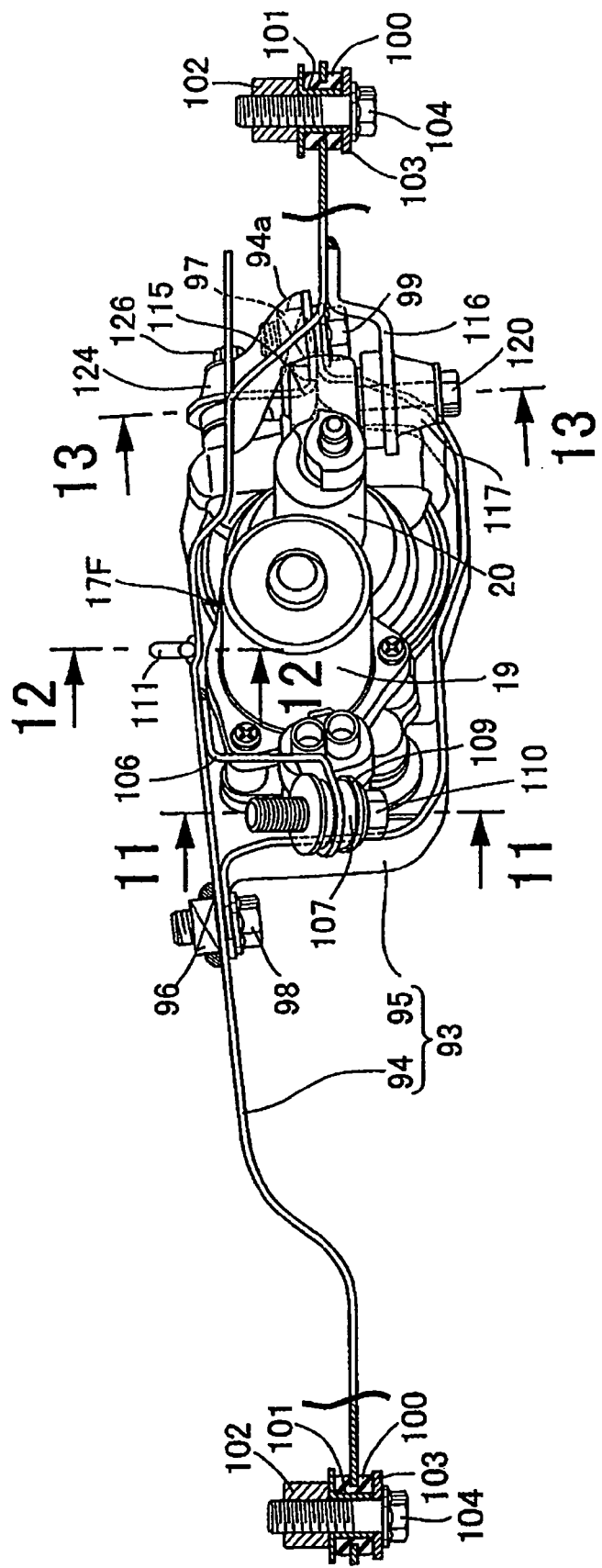
FIG. 9 is a sectional view taken along line 9-9 of FIG. 8.

Referring to FIG. 9 also, a weld nut 96 is securely attached to the rear surface of an intermediate part in the width direction of the first support frame 94, and a weld nut 97 is secured to the rear surface of a tip part of a support arm part 94a branched in skewed manner downward from a left-side end part (in FIG. 8, a right-side end part) of the first support frame 94 as viewed from a person facing in the running (forward) direction of the motorcycle. One end part of the second support frame 95 is fastened to the intermediate part in the width direction of the first support frame 94 by a bolt 98 screw engaged with the weld nut 96, and the other end part of the second support frame 95 is firmly attached to the tip part of the support arm part 94a of the first support frame 94 by a bolt 99 screw engaged with the weld nut 97.

Figure 10:
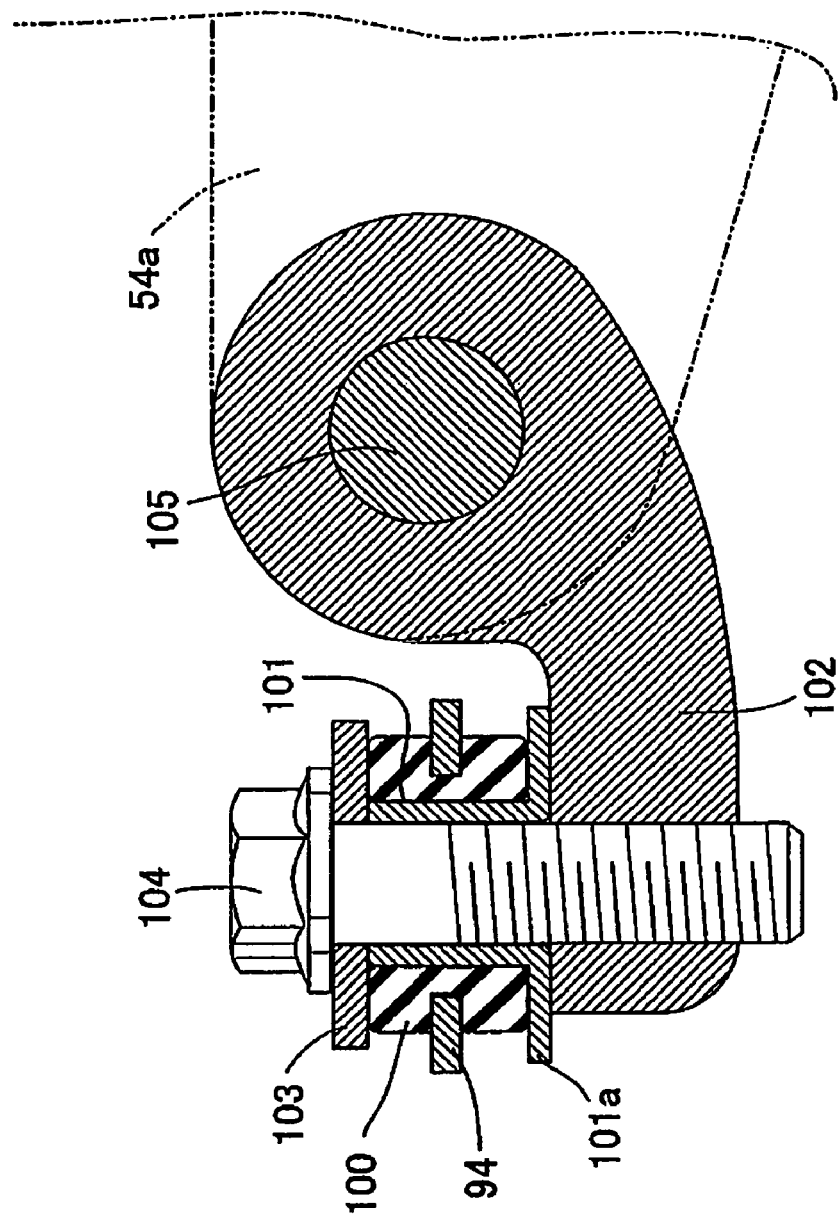
FIG. 10 is a sectional view taken along line 10-10 of FIG. 8.

Referring to FIG. 10 also, while the brackets 53a . . . provided at the crankcase 53 of the engine body 51 are fastened to the engine hangers 50 . . . provided to be integral with the main frames 46 . . . through bolts 105, attaching members 102 . . . clamped between the brackets 53a . . . and the engine hangers 50 . . . are co-fastened to the engine hangers 50 . . . together with the brackets 53a . . . by the bolts 105.

On the other hand, both end parts of the first support frame 94 are fitted with mount rubbers 100, 100. Collars 101 . . . provided at their one-side ends with flange parts 101a . . . projecting outwards are inserted in the mount rubbers 100 . . . , and the flange parts 101a . . . are put in abutment on the attaching members 102 . . . . In addition, washers 103 . . . are put in contact with the other-side ends of the collars 101 . . . so that the collars 101 . . . are clamped between the washers 103 . . . and the attaching members 102 . . . , and bolts 104 . . . passed through the washer 103 . . . and the collars 101 . . . are screw engaged with the attaching members 102 . . . . Thus, both left and right end parts of the first support frame 94 of the support 93 are fastened to the engine hangers 50 . . . of the left-right pair of main frames 46 . . . , by co-fastening thereof together with the brackets 53a . . . of the crankcase 53 in the engine body 51.

Figure 11:
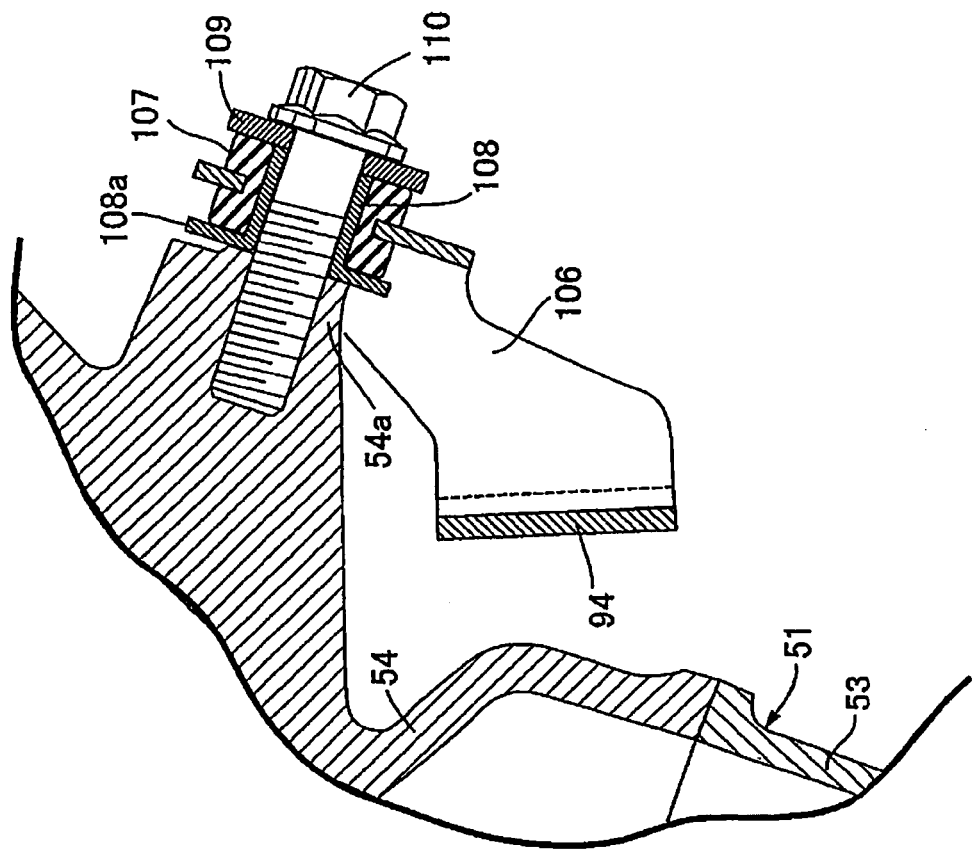
FIG. 11 is a sectional view taken along line 11-11 of FIG. 9.

Referring to FIG. 11 also, an attaching arm 106 extending upwards is securely attached to an intermediate part in the left-right direction of the first support frame 94. A mount rubber 107 is mounted to an upper end part of the attaching arm 106, and a collar 108 provided at its one end with a flange part 108a projecting outwards is passed through the mount rubber 107. On the other hand, the cylinder block 54 of the engine body 51 is provided with a support boss part 54a for contact with the flange part 108a. A washer 109 is put in contact with the other end of the collar 108 so as to clamp the collar 108 between itself and the support boss part 54a, and a bolt 110 passed through the washer 109 and the collar 108 is screw engaged with the support boss part 54a.

Figure 12:
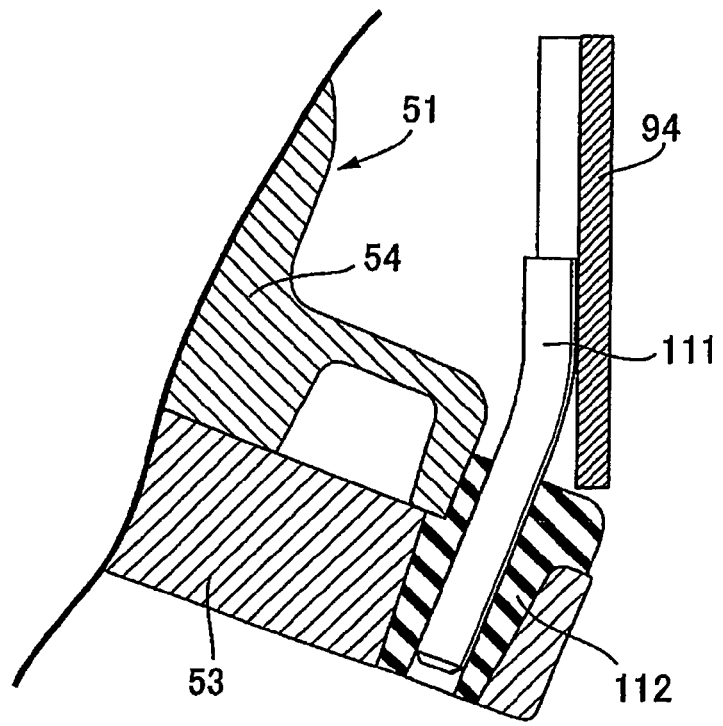
FIG. 12 is an enlarged sectional view taken along line 12-12 of FIG. 9.

Referring to FIG. 12 also, a support bar 111 extending downwards is secured to an intermediate part in the left-right direction of the first support frame 94. The support bar 111 is fitted in a mount rubber 112 mounted to the crankcase 53 of the engine body 51.

Thus, both the left and right end parts of the first support frame 94 of the support 93 are supported on the engine hangers 50 . . . of the main frames 46 . . . through the mount rubbers 100 . . . , and the intermediate part in the left-right direction of the first support frame 94 is supported on the engine body 51 through the mount rubbers 107, 112.

The front fluid pressure generating unit 17F is elastically supported by the support 93, and a support plate 116 opposed from the front side to a bracket 115 provided at a left side part of the front fluid pressure generating unit 17F is firmly attached to the first support frame 94 of the support 93.

Figure 13:
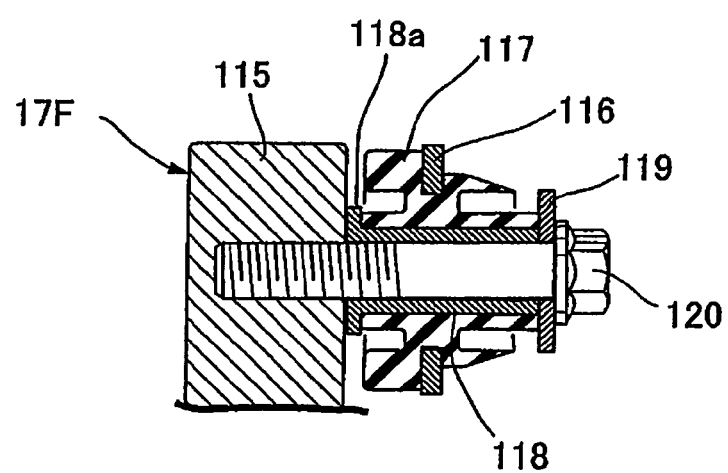
FIG. 13 is an enlarged sectional view taken along line 13-13 of FIG. 9.

In FIG. 13, a mount rubber 117 is mounted to the support plate 116, and a collar 118 provided at its one end with a flange part 118a projecting outwards is passed through the mount rubber 117 so that the flange part 118a makes contact with the bracket 115. In addition, a washer 119 is put in contact with the other end of the collar 118 so as to clamp the collar 118 between itself and the bracket 115, and a bolt 120 passed through the washer 119 and the collar 118 is screw engaged with the bracket 115.

Besides, the second support frame 95 is provided with a support plate part 121 which is opposed to the front fluid pressure generating unit 17F from the lower side, and a support plate 122 which is opposed to the front fluid pressure generating unit 17F from the left side. Mount rubbers 123, 124 mounted to the support plate parts 121, 122 are attached to the front fluid pressure generating unit 17F through bolts 125, 126 by use of the same structure as that shown in FIG. 13.

In short, the front fluid pressure generating unit 17F is supported on the support 93 through the mount rubbers 117, 123, and 124.

According to the arrangement structure of the front fluid pressure generating unit 17F as above, the front fluid pressure generating unit 17F is arranged between the engine body 51 and the exhaust pipes 59 . . . extended downwards from the cylinder head 52. Therefore, the front fluid pressure generating unit 17F can be laid out by utilizing effectively the vacant space which is on the front side of the engine body 51 and on the lower side of the exhaust pipes 59 . . . , whereby concentration of mass can be contrived. Moreover, although the heat from the exhaust pipes 59 . . . reaches the front fluid pressure generating unit 17F, the running airflow generated by the running of the motorcycle comes into contact with the front fluid pressure generating unit 17F, so that the temperature of the front fluid pressure generating unit 17F can be prevented from rising excessively. In addition, since the support 93 for supporting the front fluid pressure generating unit 17F is supported through the mount rubbers 100 . . . , 107, 112 on the engine body 51 and the engine hangers 50 . . . of the main frames 46 . . . constituting a part of the body frame F, transmission of vibrations from the engine E to the front fluid pressure generating unit 17F can also be restrained.

In addition, the cylinder head 52 is connected to an upper part of the cylinder block 54 rising at a forwardly upward inclination from the crankcase 53. The exhaust pipes 59 . . . connected to the front surface of the cylinder head 52 have the inclined surfaces 59a . . . extending forwardly downwards from the front surface of the cylinder head 52, and the curved parts 59b ... curved from the lower parts of the inclined parts 59a ... toward the lower side of the engine body 51, and a space triangular in shape in side view is formed between the exhaust pipes 59 ... and the front surface of the engine body 51. Moreover, the front fluid pressure generating unit 17F is laid out in the space. Therefore, since a comparatively large space can be secured between the exhaust pipes 59 ... and the front surface of the engine body 51, the running airflow can easily flow in the surroundings of the front fluid pressure generating unit 17F disposed in the space, and the temperature of the front fluid pressure generating unit 17F can be effectively prevented from rising excessively.

Besides, both the left and right end parts of the first support frame 94 in the support 93 are supported on the engine hangers 50 ... of the left-right pair of main frames 46 ... through the mount rubbers 100 ..., and the intermediate part in the left-right direction of the first support frame 94 is supported on the engine body 51 through the mount rubbers 107, 112, so that the front fluid pressure generating unit 17F can be floatingly supported while enhancing the rigidity of the support 93.

In addition, since both the left and right end parts of the support 93 are fastened to the engine hangers 50 ... of the main frames 46 ... by co-fastening thereof together with the brackets 53a ... of the crankcase 53 of the engine body 51, a reduction in the number of component parts and a reduction in the number of working steps can be contrived.

Besides, the support 93 is composed in a frame form by use of the first support frame 94 which is attached to the engine hangers 50 ... of the main frames 46 ... and which extends in the left-right direction on the rear side of the front fluid pressure generating unit 17F, and the second support frame 95 which is attached to the first support frame 94 in such a manner as to surround the front fluid pressure generating unit 17F from the front side. Therefore, the front fluid pressure generating unit 17F can be supported in such a manner that the front fluid pressure generating unit 17F can easily receive the running airflow.

Furthermore, since the front fluid pressure generating unit 17F is laid out on the rear lower side of the radiator 61 supported by the body frame F on the front side of the engine body 51, the front fluid pressure generating unit 17F can be protected by the radiator 61 and the exhaust pipes 59 ... from foreign matters such as flying stones coming from the front side.

Rear-Wheel Pressure-regulating Unit 18R

Figure 14:
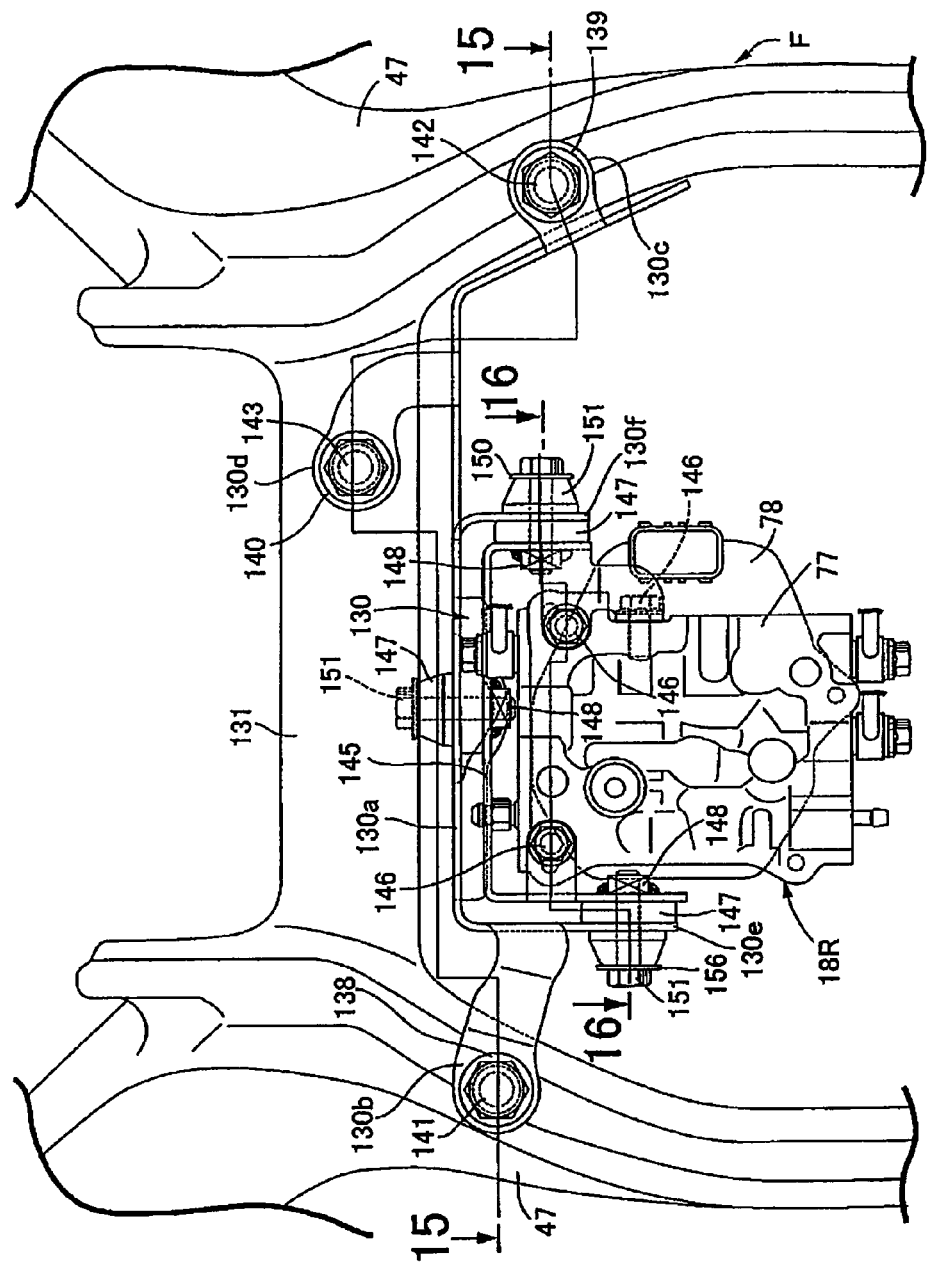
FIG. 14 is a view from a rear side of a rear-wheel pressure-regulating unit according to an exemplary embodiment of the present invention and the body frame.
Figure 15:
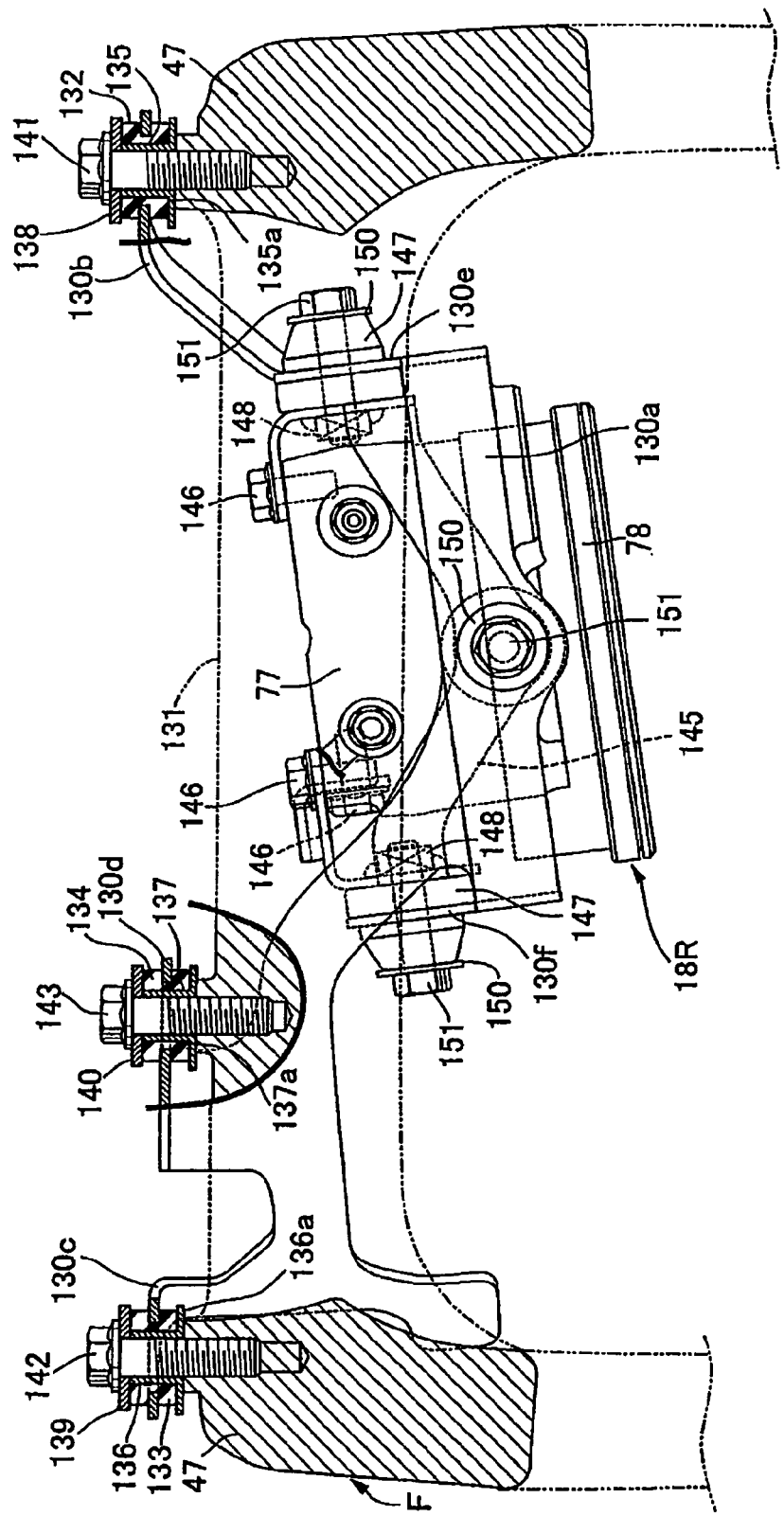
FIG. 15 is a sectional view taken along line 15-15 of FIG. 14.

An arrangement structure of the rear-wheel pressure-regulating unit 18R will be described referring to FIGS. 2 and 14 to 16. First, as shown in FIG. 2, the rear-wheel pressure-regulating unit 18R is arranged on the rear side of the engine body 51 and between an upper end part of the cushion unit 65 and the engine body 51. The rear-wheel pressure-regulating unit 18R is supported by a support member 130, as shown in FIGS. 14 and 15.

The support member 130 includes: a support member main part 130a which is arranged between both the center frames 47, 47 while having a part thereof opposed from above to the rear-wheel pressure-regulating unit 18R disposed on the lower side of a cross member 131 with a base part 77 located on the rear side and with a cover 78 located on the front side; attaching arm parts 130b, 130c, 130d extended from the support member main part 130a so as to be opposed to both the center frames 47, 47 and the back surface of the cross member 131; and a pair of support arm parts 130e, 130f drooping from the support member main part 130a so as to be located on both the left and right sides of the rear-wheel pressure-regulating unit 18R.

Mount rubbers 132, 133, and 134 are mounted to tip parts of the attaching arm parts 130b, 130c, and 130d. Collars 135, 136, and 137 provided at their one-side ends with flange parts 135a, 136a, and 137a projecting outwards are passed through the mount rubbers 132 to 134 so that the flange parts 135a to 137a make contact with the center frames 47, 47 and the back surface of the cross member 131. In addition, washers 138, 139, and 140 are put in contact with the other-side ends of the collars 135 to 137 so that the collars 135 to 137 are clamped between them and the center frames 47, 47 and the cross member 131. Bolts 141, 142, and 143 passed through the washers 138 to 140 and the collars 135 to 137 are screw engaged with the center frames 47, 47 and the cross member 131.

A frame member 145 is attached to an upper part of the base 77 of the rear-wheel pressure-regulating unit 18R by three bolts 146, 146, and 146, for example. The frame member 145 is disposed between the support member main part 130a and both the support arm parts 130e, 130f of the support member 130, and the rear-wheel pressure-regulating unit 18R. Three portions of the frame member 147 are supported respectively on the support member main part 130a and both the support arm parts 130e, 130f through mount rubbers 147 .... Specifically, the upper part of the rear-wheel pressure-regulating unit 18R is attached to the support member 130 through the mount rubbers 147 ... so as to be supported in a suspended manner from the support member 130.

Figure 16:
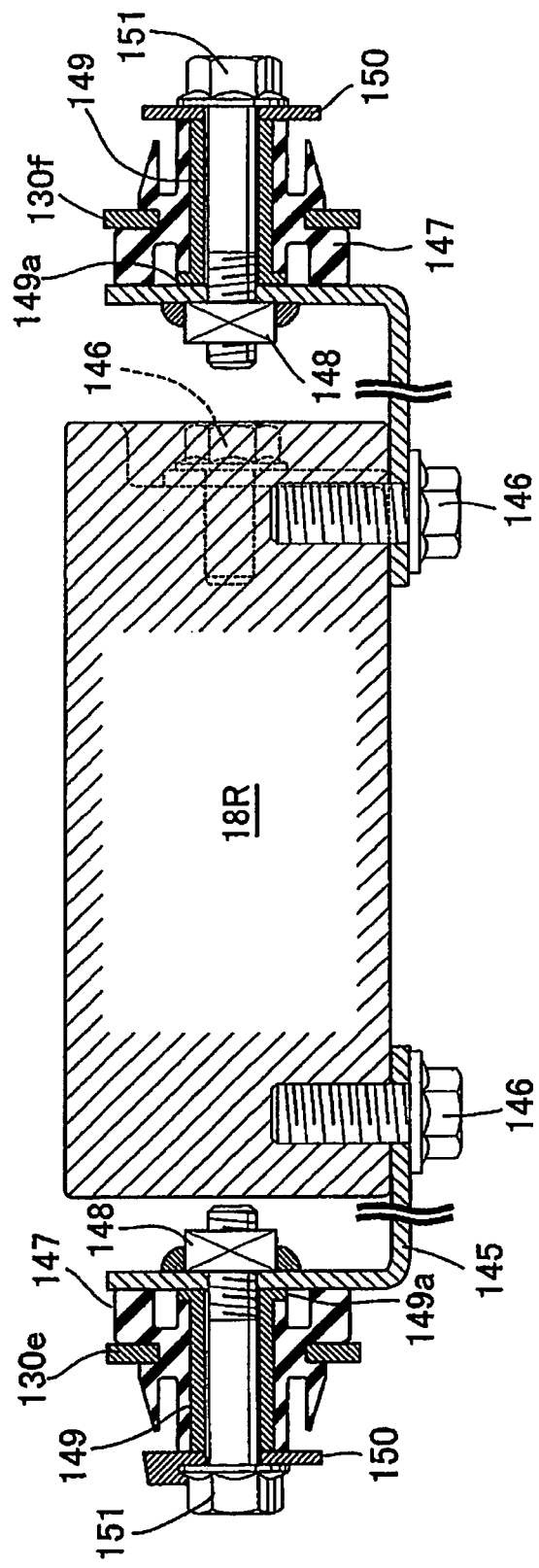
FIG. 16 is a sectional view taken along line 16-16 of FIG. 14.

In FIG. 16, the mount rubbers 147 ... are mounted respectively to the support member main part 130a and both the support arm parts 130e, 130f of the support member 130, and weld nut 148 are securely attached to the frame member 145 in the manner of corresponding to the mount rubbers 147 .... In addition, collars 149 ... provided at their one-side ends with flange parts 149a projecting outwards are passed through the mount rubbers 147 ... so that the flange parts 149a ... are clamped between them and the support member main part 130a and both the support arm parts 130e, 130f. Besides, washers 150 ... are put in contact with the other-side ends of the collars 149 ... so that the collars 149 ... are clamped between them and the support member main part 130a and both the support arm parts 130e, 130f, and bolts 151 ... passed through the washer 150 ... and the collars 149 ... are screw engaged with the weld nuts 148 ....

According to the arrangement structure of the rear-wheel pressure-regulating unit 18R as above, the support member 130 for supporting the rear-wheel pressure-regulating unit 18R is floatingly supported by the pair of center frames 47 ... disposed on both the left and right sides of the engine body 51 and by the cross member 131 for connecting the center frame 47 ... to each other on the rear side of the engine body 51 in such a manner as to constitute a part of the body frame F together with the center frames 47 ..., through the mount rubbers 132, 133, and 134. Therefore, vibrations transmitted from the engine E can be prevented from reaching the rear wheel pressure-regulating unit 18R. Moreover, the rigidity of the support member 130 can be set to a level sufficient to hold the rear wheel pressure-regulating unit 18R, without being affected by the rigidity on the side of the body frame F, which makes it unnecessary to enhance the strength of the support member 130 more than required. Thus, reductions in weight and cost can be contrived.

In addition, since the upper part of the rear wheel pressure-regulating unit 18R is so attached as to be suspended from the support member 130, the position of the rear wheel pressure-regulating unit 18R in the width direction of the body frame F can easily be conditioned so as not to interfere with other component parts.

Further, the rear wheel pressure-regulating unit 18R is arranged between the engine body 51 and the upper end part of the cushion unit 95 provided between the swing arm 62 and the link member 64, which constitutes a part of the link mechanism 63 provided between the swing arm 62 and the body frame F. Therefore, the rear wheel pressure-regulating unit 18R can be effectively laid out in the space between the engine body 51 and the upper end part of the cushion unit 65. Moreover, the rear wheel pressure-regulating unit 18R can be protected by surrounding the left and right sides and the front and rear sides of the rear wheel pressure-regulating unit 18R with the body frame F, the engine body 51 and the cushion unit 65.

Rear-Wheel Fluid Pressure Generating Unit 17R

Figure 17:
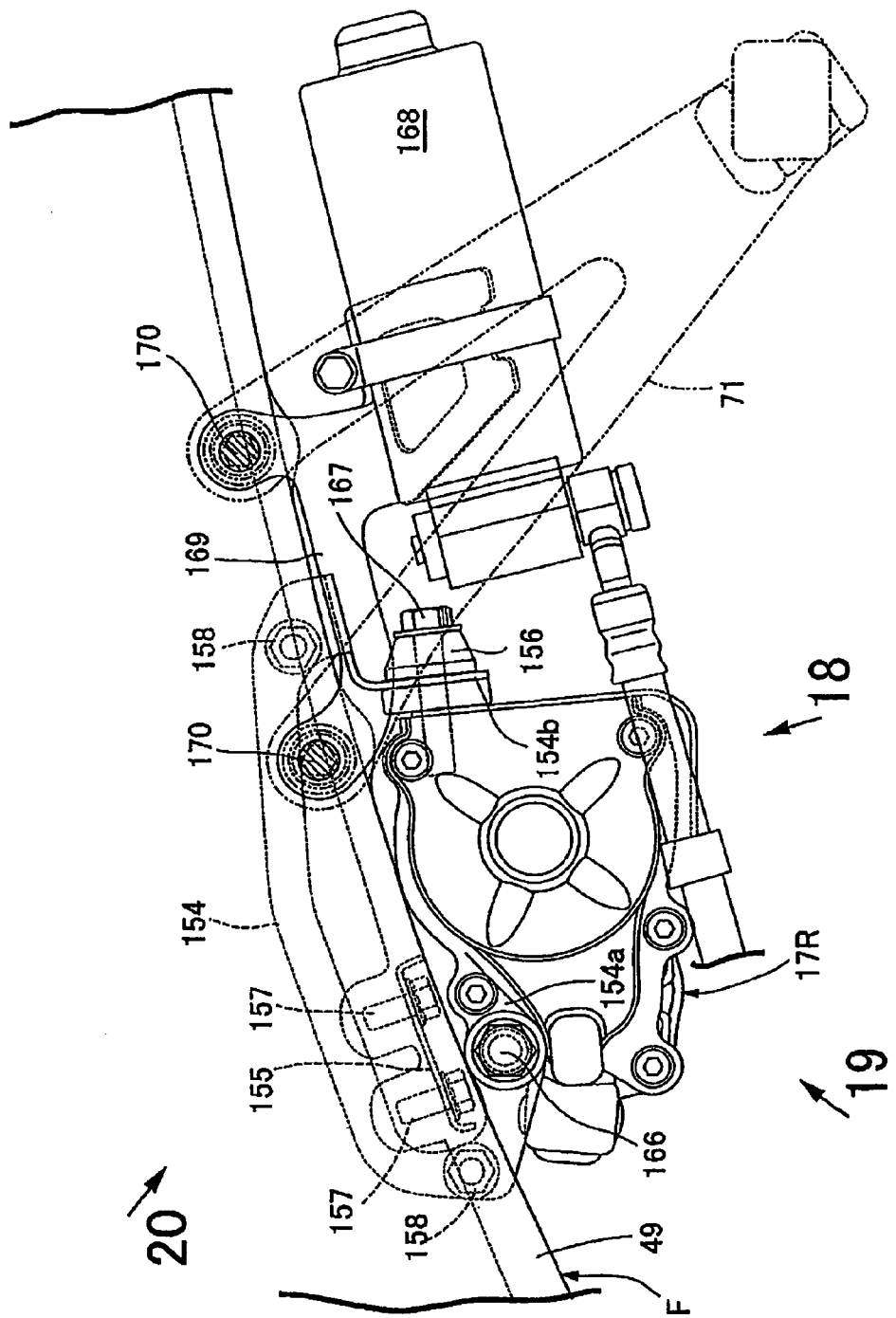
FIG. 17 is an enlarged view of that portion of FIG. 2 which shows the rear-wheel fluid pressure generating unit and the surroundings thereof.
Figure 18:
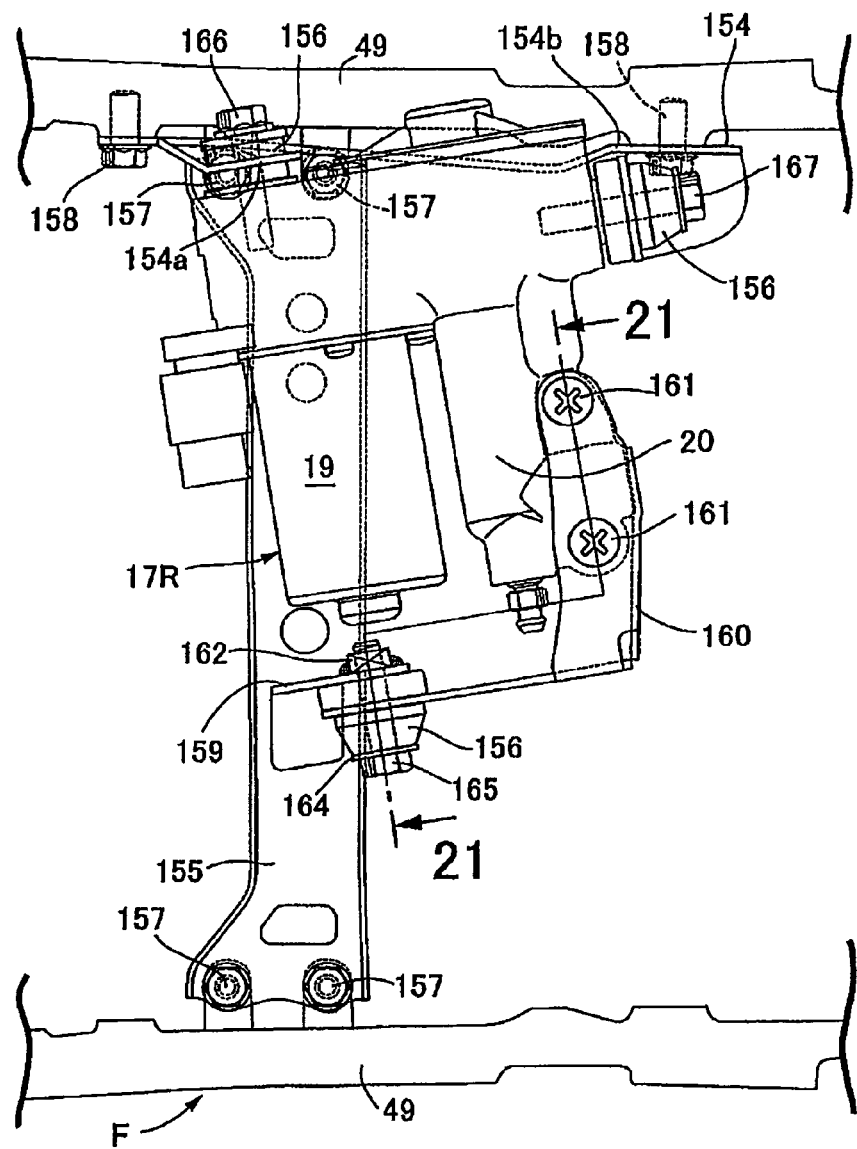
FIG. 18 is a view taken along arrow 18 of FIG. 17.

An arrangement structure of the rear-wheel fluid pressure generating unit 17R will be described referring to FIGS. 17 to 21. First, as shown in FIGS. 17 and 18, the rear-wheel fluid pressure generating unit 17R is supported on the left-right pair of seat rails 49 . . . constituting a part of the body frame F; in plan view, it is arranged between both the seat rails 49, 49 at a position nearer to the left-side seat rail 49 of both the seat rails 49 . . . .

Figure 19:
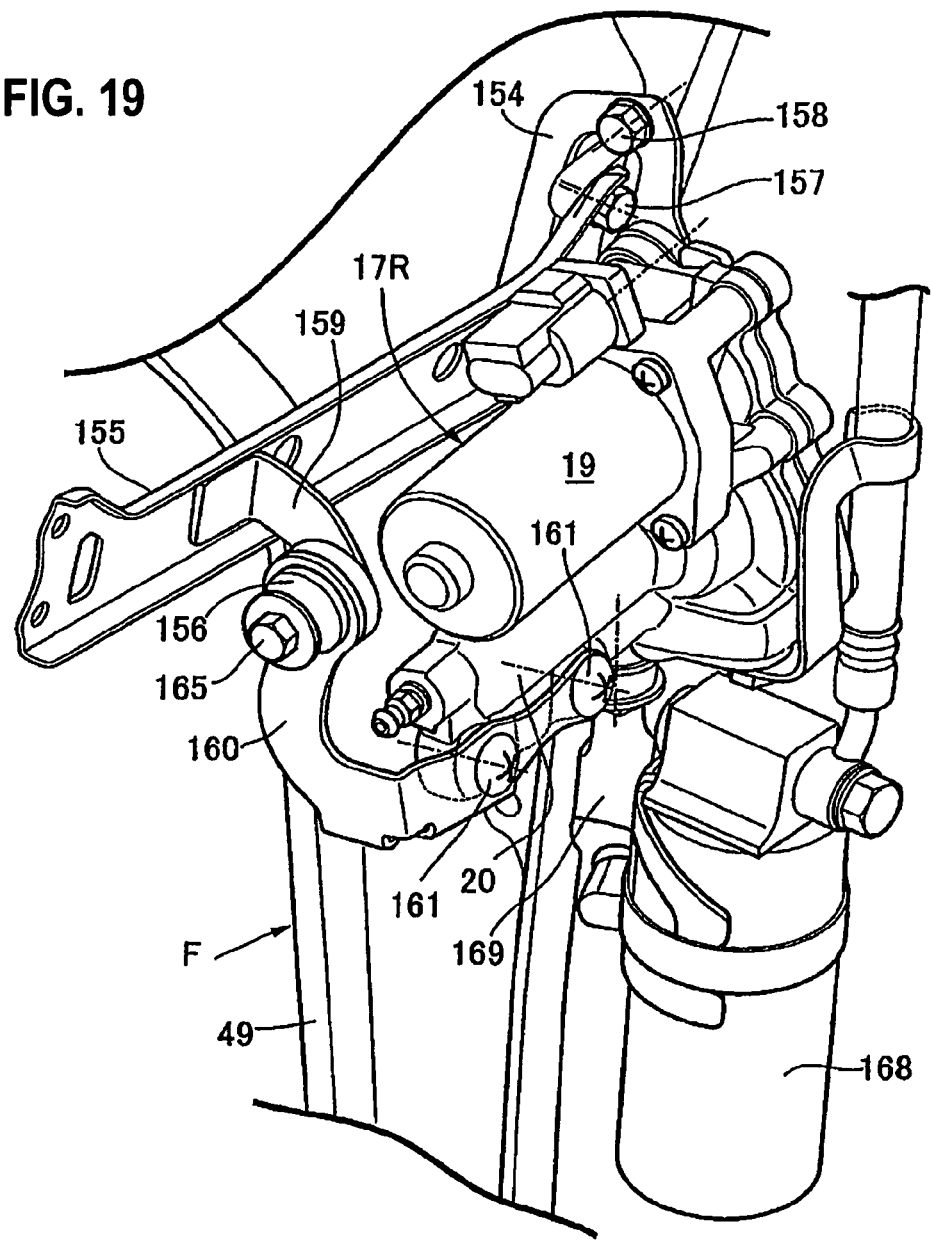
FIG. 19 is a perspective view taken along arrow 19 of FIG. 17.
Figure 20:
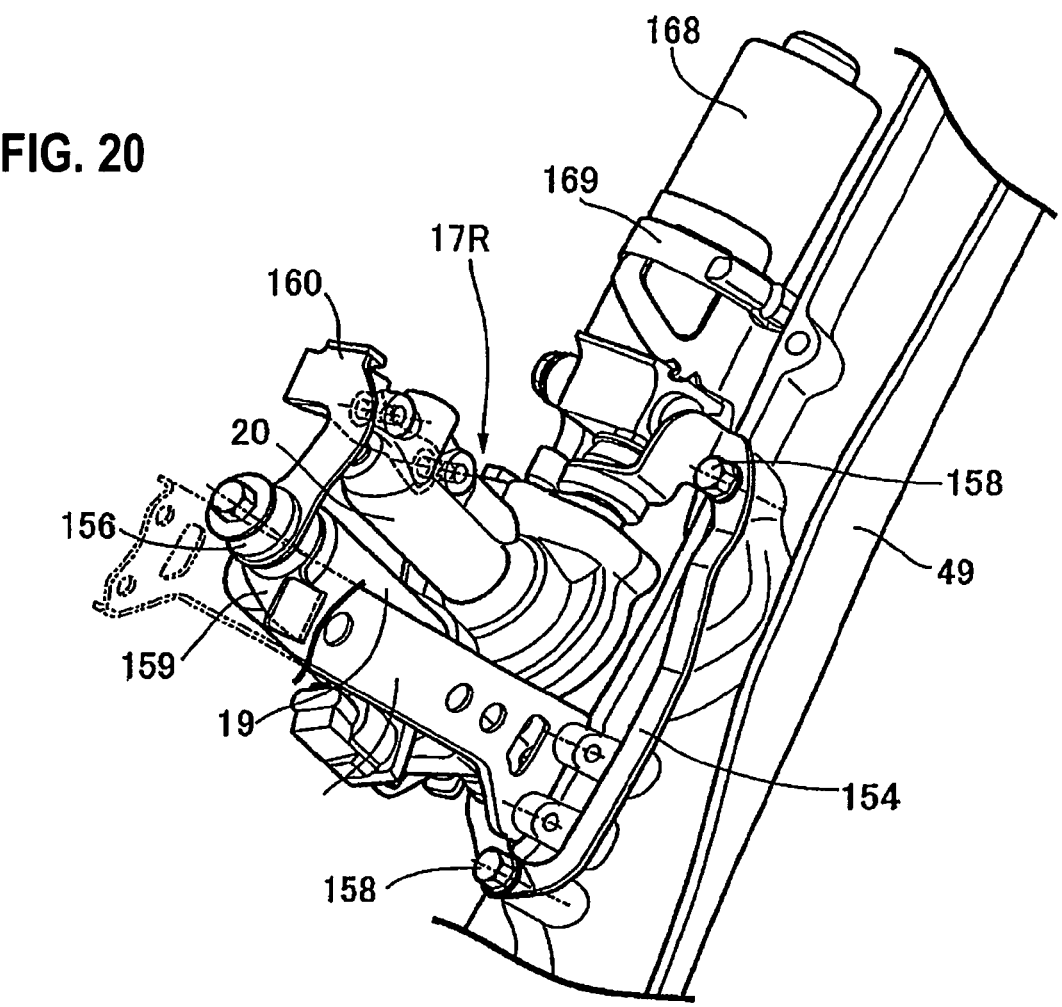
FIG. 20 is a perspective view taken along arrow 20 of FIG. 17.

Referring to FIGS. 19 and 20 also, a first support member 154 is attached to the left-side seat rail 49 of both the seat rails 49 . . . , and the rear-wheel fluid pressure generating unit 17R is floatingly supported by the first support member 154 and a cross member 155 for connection between both the seat rails 49 . . . , through mount rubbers 156 . . . .

Both end parts of the cross member 155 are connected to the seat rails 49 . . . by pairs of bolts 157, 157 . . . . Besides, the first support member 154 is fastened to the left-side seat rail 49 by a pair of bolts 158, 158.

A second support member 159 is secured to the cross member 155, and an attaching member 160 fixed to the rear-wheel fluid pressure generating unit 17R is supported on the second support member 159 through a mount rubber 156.

Figure 21:
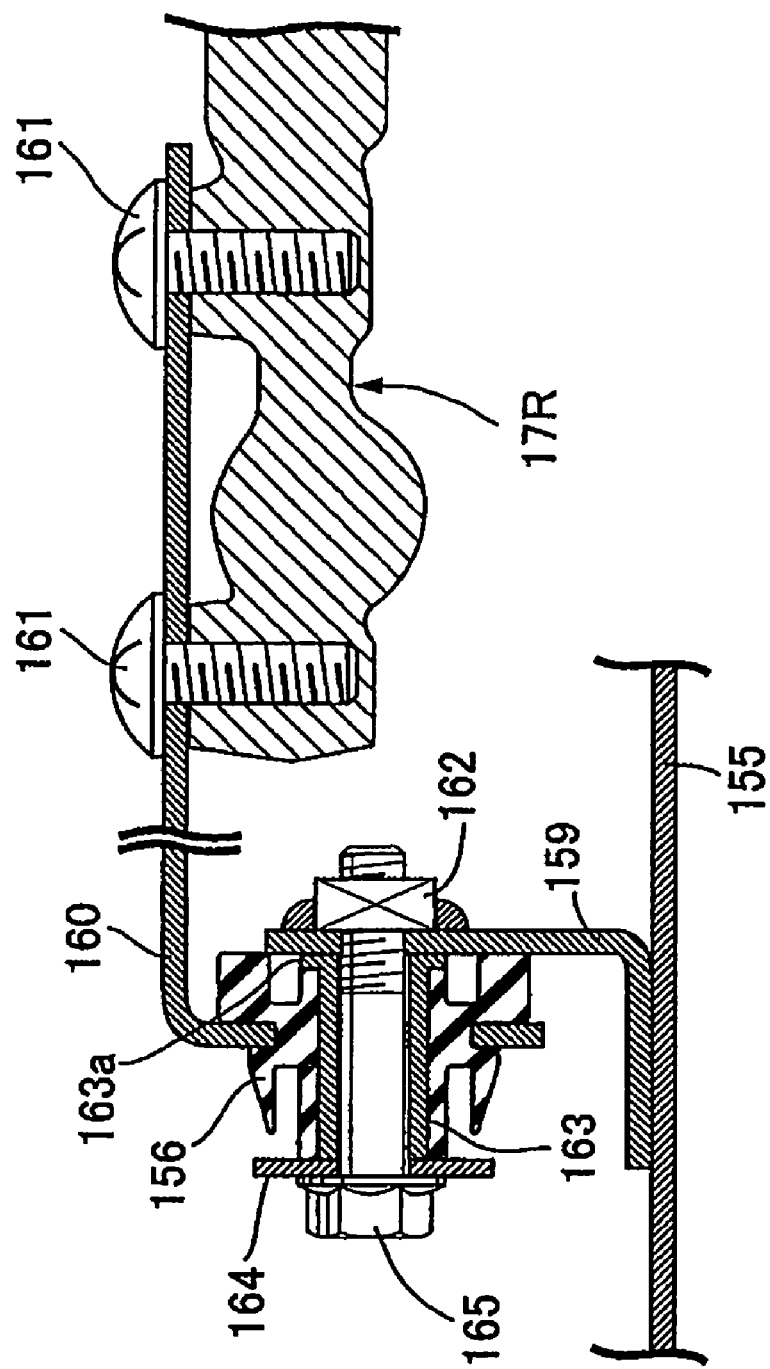
FIG. 21 is a sectional view taken along line 21-21 of FIG. 18.
Figure 22:
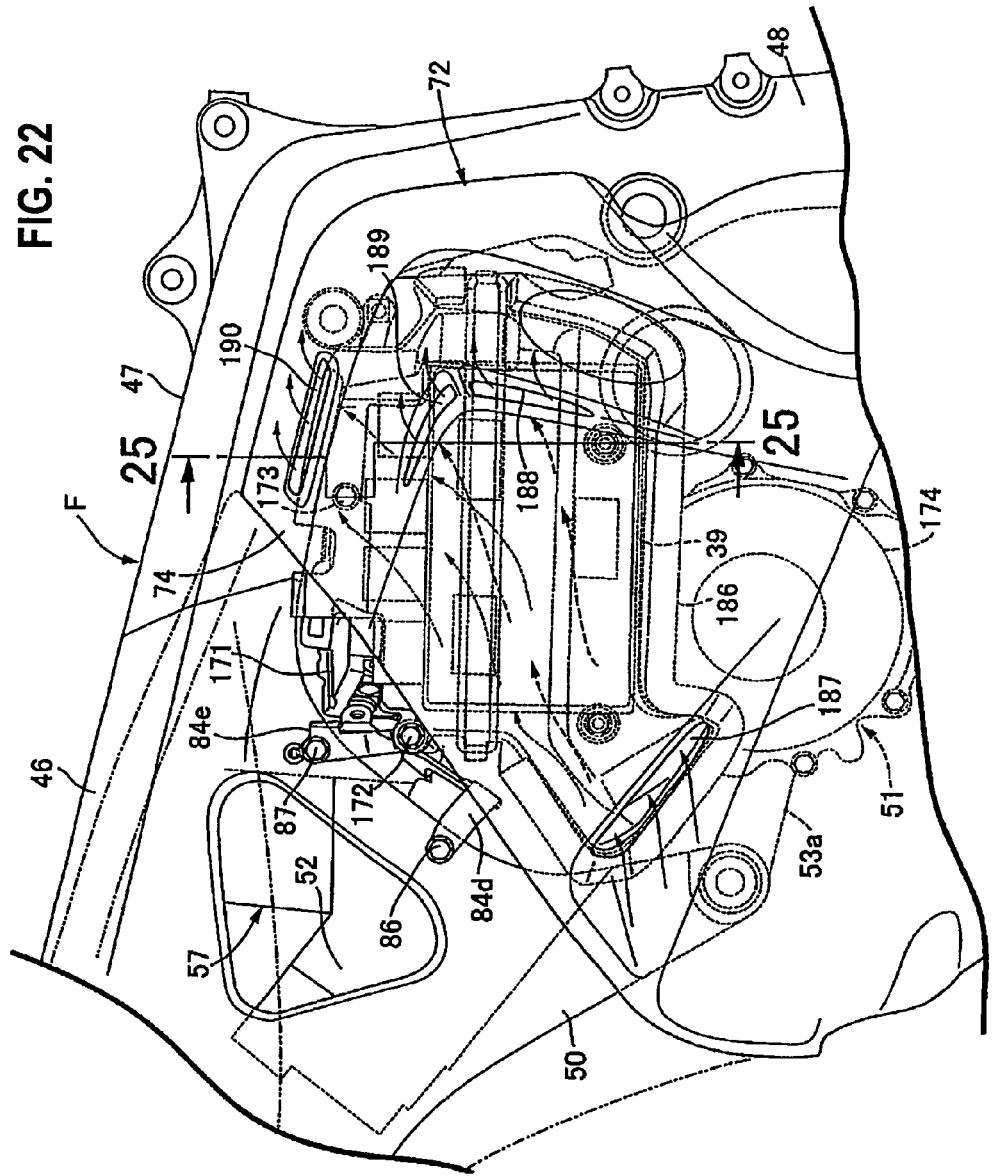
FIG. 22 is an enlarged view of that portion of FIG. 2 which shows a control unit according to an exemplary embodiment of the present invention and the vicinity thereof.
Figure 23:
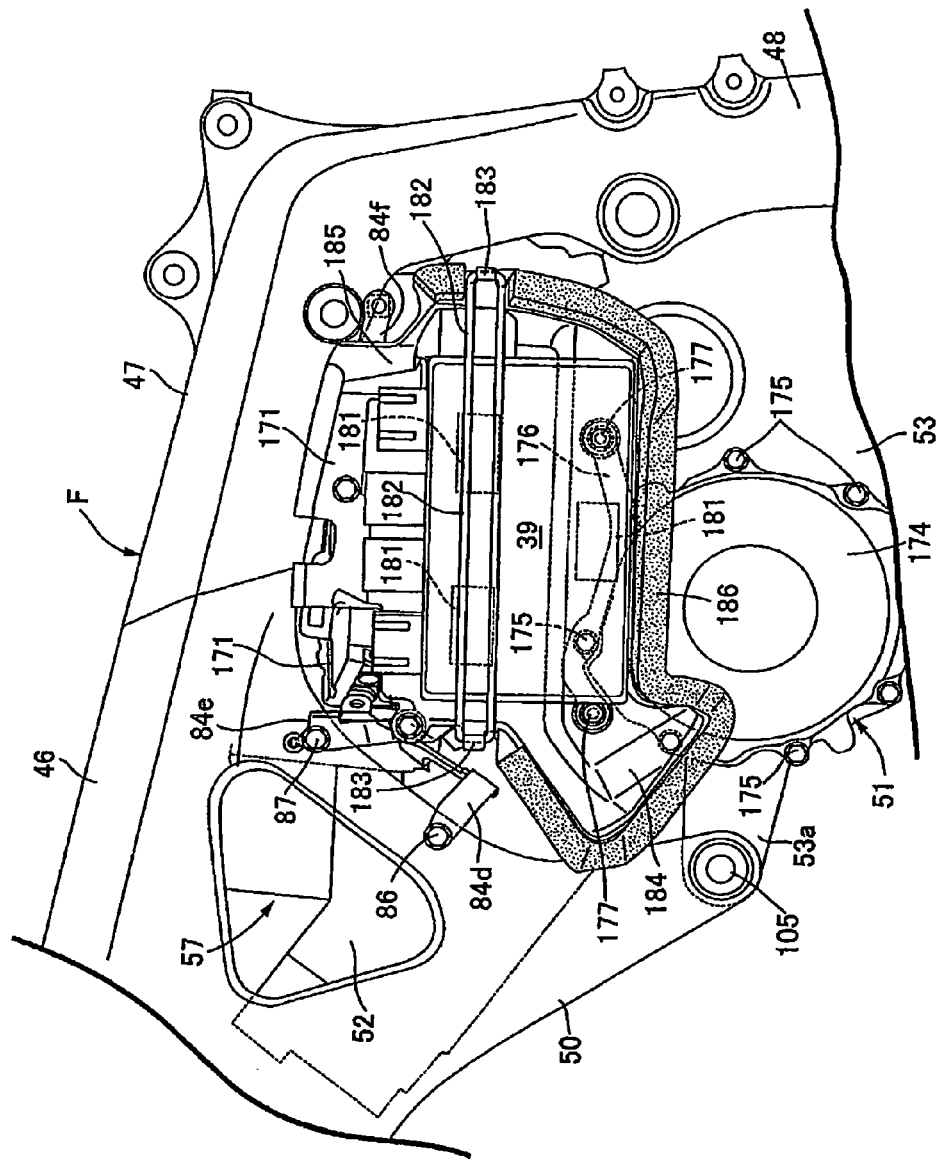
FIG. 23 is a view, corresponding to FIG. 22, showing a condition where a front cowl is removed.
Figure 24:
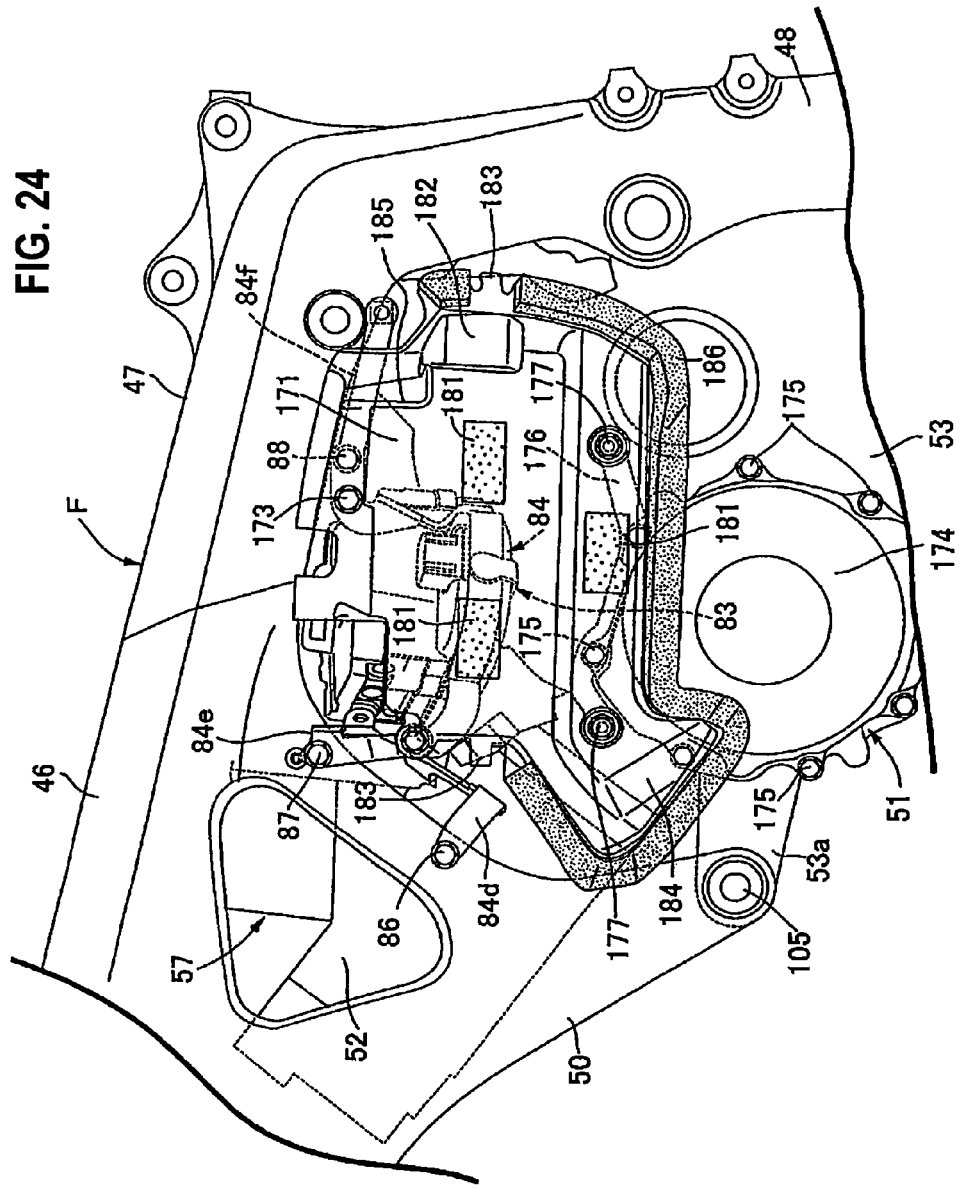
FIG. 24 is a view showing a condition where the control unit is removed from the condition shown in FIG. 23.
Figure 25:
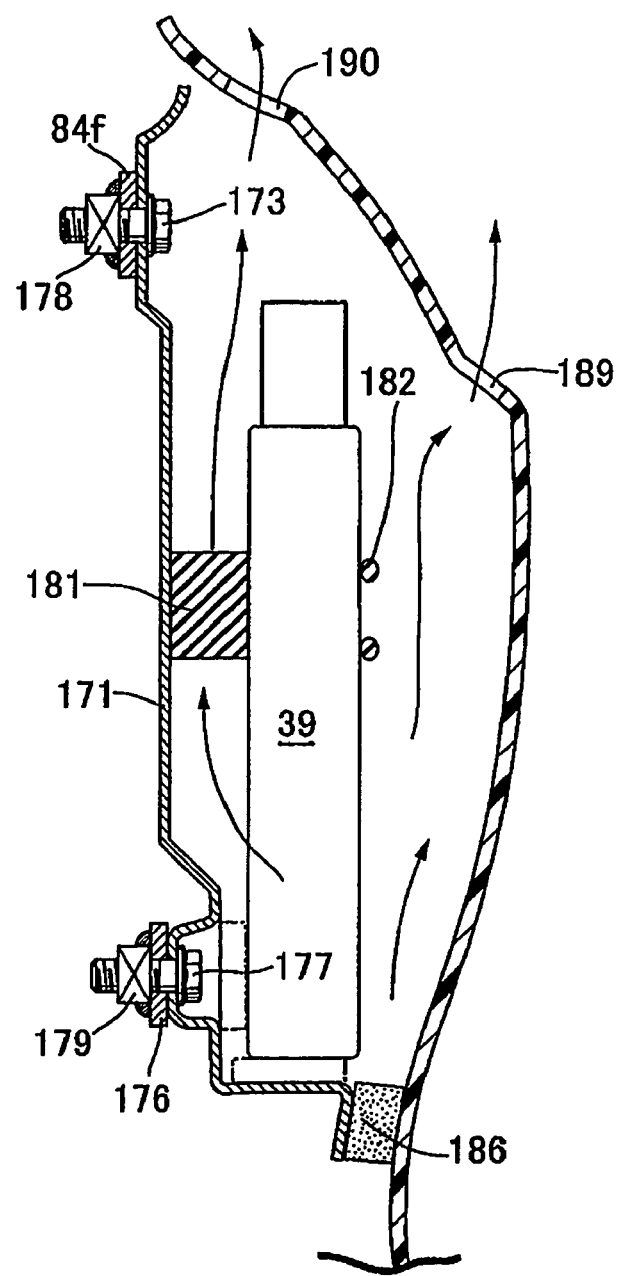
FIG. 25 is a sectional view taken along line 25-25 of FIG. 22.

Referring to FIG. 21 also, the attaching member 160 is firmly attached to the cylinder body 20 of the rear-wheel fluid pressure generating unit 17R by a pair of screw members 161, 161, and the mount rubber 156 is mounted to the attaching member 160. In addition, a weld nut 162 is securely attached to the second support member 159 at a position corresponding to the mount rubber 156. A collar 163 provided at its one end with a flange part 163a projecting outwards is passed through the mount rubber 156 so as to put the flange part 163a in contact with the second support member 159. Besides, a washer 164 is put in contact with the other end of the collar 163 so as to clamp the collar 163 between itself and the second support member 159, and a bolt 165 passed through the washer 164 and the collar 163 is screw engaged with the weld nut 162.

In addition, a support plate part 154a opposed to the rear-wheel fluid pressure generating unit 17R from the outer side is provided at a front part of the first support member 154, and a support plate part 154b opposed to the rear-wheel fluid pressure generating unit 17R from the rear side is provided at a rear part of the first support member 154. The mount rubbers 156, 156 mounted respectively to these support plate parts 154a, 154b are attached to the rear-wheel fluid pressure generating unit 17R with bolts 166, 167, by the same attaching structure as that described referring to FIG. 21 above.

Meanwhile, a sub-tank 168 for adjusting the damping force of the cushion unit 65 provided between the swing arm 62 and the link member 64 of the link mechanism 63 is arranged on the rear side of the rear-wheel fluid pressure generating unit 17R. The sub-tank 168 is supported by the left-side seat rail 49 of both the seat rails 49 . . . .

Specifically, a sub-tank support member 169 for supporting the sub-tank 168 is fixed to the left-side seat rail 49. The sub-tank support member 169 is fixed to the left-side seat rail 49 with a pair of bolts 170, 170 by co-fastening thereof together with the pillion step 71.

According to the arrangement structure of the rear-wheel fluid pressure generating unit 17R as above, the rear-wheel fluid pressure generating unit 17R is supported by the left-right pair of seat rails 49, 49 in such a manner as to be laid out between both the seat rails 49 . . . in plan view. Therefore, the rear-wheel fluid pressure generating unit 17R can be laid out in the vicinity of the rear-wheel pressure-regulating unit 18R, which is disposed on the rear side of the engine body 51, and in a place where it is easy to secure the space necessary for disposing the rear-wheel fluid pressure generating unit 17R.

In addition, the rear-wheel fluid pressure generating unit 17R is floatingly supported by the first support member 154 which is attached to the left-side seat rail 49 of both the seat rails 49 . . . and by the cross member 155 for connection between both the seat rails 49 . . . , through the mount rubbers 156 . . . . Therefore, vibrations on the side of the body frame F can be restrained from reaching the rear-wheel fluid pressure generating unit 17R.

Besides, the sub-tank 168 for adjusting the damping force of the cushion unit 65 is disposed on the rear side of the rear-wheel fluid pressure generating unit 17R and is supported by the left-side seat rail 49. Therefore, it is possible to lay out the rear-wheel fluid pressure generating unit 17R between the sub-tank 168 and the engine body 51, and thereby to protect the rear-wheel fluid pressure generating unit 17R from external forces.

Furthermore, since the sub-tank support member 169 for supporting the sub-tank 168 is fixed to the left-side seat rail 49 by co-fastening thereof together with the pillion step 71, the number of component parts can be reduced.

Control Unit 39

An arrangement structure of the control unit 39 will be described referring to FIGS. 22 to 25. The control unit 39 is arranged on the left side of the engine body 51 mounted on the body frame F. Moreover, in order to enhance the property for "knee gripping" by the driver, the control unit 39 is disposed on the inner side relative to the vehicle body side ends of that portion of the motorcycle at which the vehicle width is the largest. The control unit 39 is contained in and supported by a synthetic resin-made control unit support case 171 interposed between the control unit 39 and the engine body 51, and is covered with the side cover part 74 constituting a part of the front cowl 72.

The control unit support case 171 is formed in a box-like shape opened on the side opposite to the engine body 51 so as to contain the control unit 39 on the side opposite to the engine body 51. Meanwhile, the front pressure-regulating unit 18F supported on the body frame F through the support 83 is arranged on the inner side relative to the control unit support case 171, and an upper part of the control unit support case 171 is attached to the support arm parts 84e, 84f possessed by the lower frame body 84 constituting a part of the support 83, by bolts 172, 173. Specifically, as clearly shown in FIG. 25, weld nuts 178 . . . are secured to the support arm parts 84e, 84f, and the bolts 172, 173 passed through the control unit support case 171 and the support arm parts 84e, 84f are screw engaged with the weld nuts 178 . . . .

Meanwhile, a crankcase cover 174 such as a generating unit cover is fastened to a left side surface of the crankcase 53 constituting a part of the engine body 51, by a plurality of bolts 175, 175 . . . . To a lower support member 176 which is co-fastened to the crankcase 53 together with the crankcase cover 174 by use of one of the bolts 175, 175 . . . , a lower part of the above-mentioned control unit support case 171 is attached by a pair of bolts 177, 177. Specifically, as clearly shown in FIG. 25, a pair of weld nuts 179 . . . are firmly attached to the lower support member 176, and the bolts 177 . . . passed through the control unit support case 171 and the lower support member 176 are screw engaged with the weld nuts 179 . . . .

The control unit 39 is contained in the control unit support case 171 with, for example, three elastic members 181 . . . interposed between the control unit 39 and the control unit support case 171. The control unit 39 is supported on the control unit support case 171 through a fixing member 182 which is put in elastic contact with an outside surface of the control unit 39 along the front-rear direction of the body frame F and which is detachably attached to the control unit support case 171. The fixing member 182 may be, for example, an endlessly continuous rubber band, which is selectively engaged with and disengaged from lock parts 182, 182 provided at the control unit support case 171 at positions on the front and rear sides of the control unit 39.

The control unit support case 171 is provided with a running airflow leading-in part 184 for permitting the running airflow to pass to the side of the control unit 39, the running airflow inlet part 184 being located on the lower front side of the control unit 39, and also with a running airflow leading-out part 185 for leading out the running airflow having passed through the lateral sides of the control unit 39, the running airflow leading-out part 185 being located on the upper rear side of the control unit 39.

The side cover part 74 of the front cowl 72 covers the control unit 39, with a cushion member 186 between itself and a lower part of the control unit support case 171. The side cover part 74 is provided with a running airflow intake port 187 at its portion corresponding to the running airflow leading-in part 184, and with running airflow exhaust ports 188, 189, and 190 at its portions corresponding to the running airflow leading-out part 185.

According to the arrangement structure of the control unit 39 as above, the control unit 39 arranged on a lateral side of the engine body 51 is contained in and supported by the control unit support case 171 interposed between the control unit 39 and the engine body 51. Therefore, direct reach of the heat from the engine body 51 to the control unit 39 can be avoided by the control unit support case 171 interposed between the control unit 39 and the engine body 51, while permitting the control unit 39 to be disposed in the vicinity of the engine body 51.

Moreover, the running airflow leading-in part 184 for permitting the running airflow to pass to the side of the control unit 39 is formed at a front part of the control unit support case 171, and the running airflow leading-out part 185 for leading out the running airflow having passed through the lateral sides of the control unit 39 is formed at a rear part of the control unit support case 171. Therefore, during running of the motorcycle, the running airflow can be caused to pass through the lateral sides of the control unit 39, thereby cooling the control unit 39.

In addition, an upper part of the control unit support case 171 is attached to the support arm parts 84e, 84f of the support 93 supporting the front pressure-regulating unit 18F on the body frame F. Therefore, the component parts and members for supporting the front pressure-regulating unit 18F and the control unit support case 171 onto the body frame F can be made to be suited to common use, which contributes to a reduction in the number of component parts.

Besides, a lower part of the control unit support case 171 is attached to the lower support member 176 which is co-fastened to the crankcase 53 together with the crankcase cover 174 fastened to one side of the crankcase. Therefore, the bolts 175 for fastening the lower support member 176 to the side of the crankcase 53 can be used in common to the fastening of the crankcase cover 174, which contributes to a reduction in the number of component parts.

In addition, the control unit 39 accompanied by the plurality of elastic members 181 . . . interposed between itself and the control unit support case 171 is supported on the control unit support case 171 by the fixing member 182 which is put in elastic contact with the outside surface of the control unit 39 along the front-rear direction of the body frame F and which is detachably attached to the control unit support case 171. Therefore, the fixing member 182 can be attached and detached easily, whereby maintainability of the control unit 39 can be enhanced.

Furthermore, the control unit 39 is covered with the side cover part 74 constituting a part of the front cowl 72, and the running airflow intake port 187 and the running airflow exhaust ports 188, 189, and 190 are provided at portions corresponding to the running airflow leading-in part 184 and the running airflow leading-out part 185 of the side cover part 74. Therefore, the running airflow can be introduced from the exterior into the running airflow leading-in part 184 and can be exhausted from the running airflow leading-out part 185, whereby performance of cooling the control unit 39 is maintained, and, at the same time, the control unit 39 is covered with the side cover part 74, whereby the control unit 39 can be protected from external foreign matter, rainwater, etc.

While an exemplary embodiment of the present invention has been described above, the invention is not limited to the embodiment, and various design modifications are possible without departure from the invention as described in the appended claims. The foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A brake system for a motorcycle, comprising:
an operating amount detector for detecting an operating amount of a manually operable brake operating element,
a fluid pressure generating unit capable of generating a fluid pressure separately from an operation of said brake operating element,
a pressure-regulating unit interposed between said fluid pressure generating unit and a wheel brake for regulating an output fluid pressure from said fluid pressure generating unit and applying the regulated fluid pressure to said wheel brake,
a control unit for controlling the operation of said pressure-regulating unit based on output from said operating amount detector,
a flexibly resilient case covering said pressure-regulating unit, and
a support member for supporting the case on a body frame of the motorcycle, said support member configured and arranged to flexibly support the pressure-regulating unit thereon in a vibration-damping manner, said support member having a cage structure comprising:

a lower cage body portion which is attached to said body frame and configured to receive a lower part of said pressure-regulating unit and to support said pressure-regulating unit therein on a lower side thereof, said lower cage body portion comprising a wraparound cage part for contacting a side portion of said pressure-regulating unit, and at least one support plate part attached to the wraparound cage part and configured to extend below the pressure-regulating unit; and an upper cage body portion which is fastened to said lower cage body portion such that the flexibly resilient case is disposed therebetween;

wherein said pressure-regulating unit is supported between said lower and upper cage bodies through said flexibly resilient case.

2. The brake system for a motorcycle as set forth in claim 1, wherein the case and support member cooperate to help isolate the pressure-regulating unit from heat and vibration.

3. The brake system for a motorcycle as set forth in claim 1 wherein said case comprises lower and upper case members formed from a flexibly resilient material and provided as bisected lower and upper parts configured to support said pressure regulating unit therebetween, wherein said upper case member has a plurality of upwardly-extending alignment ribs integrally formed on an upper surface thereof.

4. The brake system for a motorcycle as set forth in claim 1, wherein at least the lower case member is integrally provided at its inner surface with a plurality of projections which contact the pressure-regulating unit.

5. The brake system for a motorcycle as set forth in claim 4, wherein the projections of the lower case are substantially L-shaped and are spaced apart from one another.

6. The brake system for a motorcycle as set forth in claim 3, wherein the upper case member has a cutout formed therein to allow a terminal connector to extend outwardly therethrough.

7. The brake system for a motorcycle as set forth in claim 1, wherein the lower cage body portion further comprises a plurality of support arm parts attached to and extending outwardly from the wraparound cage part, for attaching the support member to a frame of the motorcycle.

8. The brake system for a motorcycle as set forth in claim 3, wherein said lower cage body portion of the support member further comprises a plurality of lower attachment parts extending outwardly from the wraparound cage part;

and wherein said upper cage body portion of said support member comprises:

an upper bar for placement above the pressure-regulating unit, said upper bar fitting nestingly between the alignment ribs of the upper case; and a plurality of upper attachment parts extending outwardly from the upper bar for attaching to corresponding lower attachment parts of the lower cage body portion.

9. The brake system for a motorcycle as set forth in claim 8, wherein each of the attachment parts of the lower cage body portion has a respective weld nut attached to a lower surface thereof for receiving a threaded fastener.

10. The brake system for a motorcycle as set forth in claim 2, wherein the lower cage body portion further comprises a plurality of support arm parts attached to and extending outwardly from the wraparound cage part, for attaching the support member to a frame of the motorcycle.

11. The brake system for a motorcycle as set forth in claim 10, wherein said flexibly resilient case has a plurality of upwardly-extending alignment ribs integrally formed on an upper surface thereof;

wherein said lower cage body portion of the support member further comprises a plurality of lower attachment parts extending outwardly from the wraparound cage part;

and wherein said upper cage body portion of said support member comprises:

an upper bar for placement above the pressure-regulating unit, said upper bar fitting nestingly between the alignment ribs of the upper case; and a plurality of upper attachment parts extending outwardly from the upper bar for attaching to corresponding lower attachment parts of the lower cage body portion.

12. The brake system for a motorcycle as set forth in claim 11, wherein each of the attachment parts of the lower cage body portion has a respective weld nut attached to a lower surface thereof for receiving a threaded fastener.

13. The brake system for a motorcycle as set forth in claim 3, wherein the lower cage body portion further comprises a plurality of support arm parts attached to and extending outwardly from the wraparound cage part, for attaching the support member to a frame of the motorcycle.

14. The brake system for a motorcycle as set forth in claim 13, wherein said lower cage body portion of the support member further comprises a plurality of lower attachment parts extending outwardly from the wraparound cage part;

and wherein said upper cage body portion of said support member comprises:

an upper bar for placement above the pressure-regulating unit; and a plurality of upper attachment parts extending outwardly from the upper bar for attaching to corresponding lower attachment parts of the lower cage body portion.

15. The brake system for a motorcycle as set forth in claim 14, wherein each of the attachment parts of the lower cage body portion has a respective weld nut attached to a lower surface thereof for receiving a threaded fastener.

16. A brake system for a motorcycle, comprising
an operating amount detector for detecting an operating amount of a manually operable brake operating element,
a fluid pressure generating unit capable of generating a fluid pressure independent from an operation of said brake operating element,
a pressure-regulating unit interposed between said fluid pressure generating unit and a wheel brake for regulating an output fluid pressure from said fluid pressure generating unit and applying the regulated fluid pressure to said wheel brake,
a control unit for controlling the operation of said pressure-regulating unit based on output from said operating amount detector,
a flexibly resilient case covering said pressure-regulating unit, and
a support member for supporting the case on a body frame of the motorcycle, said support member configured and arranged to flexibly support the pressure-regulating unit thereon in a vibration-damping manner, said support member having a cage structure comprising:
a lower cage body portion which is attached to said body frame and configured to receive a lower part of said pressure-regulating unit and to support said pressure-regulating unit therein on a lower side thereof, said lower cage body portion comprising a wraparound cage part for contacting a side portion of said pressure-regulating unit, and at least one support plate part attached to the wraparound cage part and configured to extend below the pressure-regulating unit; and an upper cage body portion which is fastened to said lower cage body portion such that the flexibly resilient case is disposed therebetween;

wherein said case comprises lower and upper case members formed from a flexibly resilient material and provided as bisected lower and upper parts configured to support said pressure regulating unit therebetween, and wherein the case and support member cooperate to help isolate the pressure-regulating unit from heat and vibration.

17. The brake system for a motorcycle as set forth in claim 16, wherein at least the lower case member is integrally provided at its inner surface with a plurality of projections which contact the pressure-regulating unit.

18. The brake system for a motorcycle as set forth in claim 17, wherein the projections of the lower case are substantially L-shaped and are spaced apart from one another.

19. The brake system for a motorcycle as set forth in claim 16, wherein the upper case member has a cutout formed therein to allow a terminal connector to extend outwardly therethrough.

20. The brake system for a motorcycle as set forth in claim 16, wherein said flexibly resilient case has a plurality of upwardly-extending alignment ribs integrally formed on an upper surface thereof;

wherein the lower cage body portion further comprises:

a plurality of support arm parts attached to and extending outwardly from the wraparound cage part, for attaching the support member to a frame of the motorcycle; and a plurality of lower attachment parts extending outwardly from the first cage part;

and wherein said upper cage body portion comprises:

an upper bar for placement above the pressure-regulating unit, said upper bar fitting nestingly between the alignment ribs of the upper case; and a plurality of upper attachment parts extending outwardly from the upper bar for attaching to corresponding lower attachment parts of the lower cage body portion.

* * * * *